(12) United States Patent
Lefebvre

(10) Patent No.: US 7,975,063 B2
(45) Date of Patent: Jul. 5, 2011

(54) INFORMATIVE DATA STREAMING SERVER

(75) Inventor: Yves Lefebvre, Sherbrooke (CA)

(73) Assignee: Vantrix Corporation, Montreal, Quebec (CA)

( * ) Notice: Subject to any disclaimer, the term of this patent is extended or adjusted under 35 U.S.C. 154(b) by 237 days.

(21) Appl. No.: 12/463,410

(22) Filed: May 10, 2009

(65) Prior Publication Data

US 2010/0287297 A1 Nov. 11, 2010

(51) Int. Cl.
G06F 15/16 (2006.01)
(52) U.S. Cl. ........ 709/231; 709/246; 709/227; 709/238; 370/252; 370/338; 370/231; 455/450; 455/453; 455/423; 455/446
(58) Field of Classification Search .................. 709/231, 709/246, 227, 238; 370/252, 338, 231; 455/450, 455/453, 423, 446
See application file for complete search history.

(56) References Cited

U.S. PATENT DOCUMENTS

| | | | |
|---|---|---|---|
| 6,208,620 B1 | 3/2001 | Sen et al. | |
| 6,400,954 B1 | 6/2002 | Khan | |
| 7,299,291 B1 | 11/2007 | Shaw | |
| 7,400,588 B2 | 7/2008 | Izzat et al. | |
| 7,444,425 B2 | 10/2008 | Lehmann et al. | |
| 2002/0173315 A1 | 11/2002 | Chmaytelli | |
| 2004/0247016 A1* | 12/2004 | Faries, Jr. et al. | 374/162 |
| 2005/0060364 A1* | 3/2005 | Kushwaha et al. | 709/200 |
| 2005/0262251 A1* | 11/2005 | Klemets et al. | 709/230 |
| 2007/0091815 A1 | 4/2007 | Tinnakornsrisuphap | |
| 2007/0115918 A1 | 5/2007 | Bodin et al. | |
| 2008/0052414 A1 | 2/2008 | Panigrahi | |
| 2008/0062322 A1 | 3/2008 | Dey | |
| 2008/0075163 A1* | 3/2008 | Brydon et al. | 375/240.02 |
| 2008/0086570 A1 | 4/2008 | Dey | |
| 2008/0133766 A1 | 6/2008 | Luo | |
| 2010/0023635 A1* | 1/2010 | Labonte et al. | 709/231 |

FOREIGN PATENT DOCUMENTS

| | | |
|---|---|---|
| EP | 1372304 | 12/2003 |
| EP | 1821442 | 8/2005 |
| WO | WO 2004/056028 | 7/2004 |
| WO | WO 2004/072766 | 8/2004 |
| WO | WO 2005/122025 | 12/2005 |

(Continued)

OTHER PUBLICATIONS

R.Braden "RFC 1122—Requirement for Internet Hosts—Communication Layers" Oct. 1989, pp. 1-116.

(Continued)

*Primary Examiner* — Thuong T Nguyen
(74) *Attorney, Agent, or Firm* — IP-MEX Inc.; Victoria Donnelly

(57) ABSTRACT

A server for data streaming encodes multimedia signals at bit rates compatible with a connection of time-varying conditions and informs a client receiving a multimedia signal of changing bit rates and causes of change. The server supports several clients and includes a flow controller and at least one encoder. The flow controller derives metrics from measurements to determine a permissible transmission rate from the server to each active client. An encoder adapts individual transmission rates of signals according to respective permissible transmission rates. An overlay module, coupled to a multimedia signal source, the flow controller, and an encoder, superimposes informative insertions indicating permissible transmission rates and associated metrics on a multimedia signal to inform a client of changing transmission rates and causes of change. An informative insertion has a predefined duration and is sent either periodically or following a substantial change of network conditions.

15 Claims, 15 Drawing Sheets

FOREIGN PATENT DOCUMENTS

| | | |
|---|---|---|
| WO | WO 2006/086691 | 8/2006 |
| WO | WO2007/027891 | 3/2007 |

OTHER PUBLICATIONS

"Ortive Stream Shaper" brochure, published by Ortive Wireless, Inc. at www.ortivawireless.com, California, USA, prior to Jul. 25, 2008.

"How will you deliver high-quality video to millions of media-hungry mobile subscriber?", published by Ortive Wireless, Inc. at www.ortivawireless.com, California, USA, prior to Jul. 25, 2008.

Intel Integrted Performance Primitives 6.0—Code Samples, publisged at http://software.intel.com/en-us/articles/, May 2009.

* cited by examiner

INFORMATIVE DATA STREAMING SERVER

FIELD OF THE INVENTION

The present invention relates to data transmission from a data-streaming server to multiple clients where the server may modify flow rates to individual clients according to respective connection conditions and inform clients of flow-rate changes and causes of change.

BACKGROUND

A streaming server may establish multiple connections through a network for transmitting multimedia signals to a number of clients. A connection may traverse multiple links and the transmission properties of the connection may vary with time. To ensure preserving signal integrity as connection-state varies with time, the streaming server may adapt signals sent to a client to be compatible with current transmission limitations. In U.S. patent application Ser. No. 12/180,697, filed on Jul. 28, 2008, methods for real-time connection-state evaluation and signal-content adaptation were disclosed.

In addition to the effect of transmission path conditions, the actual flow rate of data transmitted to a client may also be influenced by conditions related to the streaming server or client's equipment. Some data compression techniques may yield a data stream of a fluctuating flow rate which follows temporal signal variations. A client may be aware of the actual flow rate of received data, which may differ from a flow rate specified in a connection request. However, the client has no means of determining the flow rate of data transmitted from the streaming server or the cause of any discrepancy between the specified flow rate and the flow rate of received data. The flow rate of received data may be less than the flow rate of data transmitted from the streaming server due to data loss en route.

There is, therefore, a need to devise an informative streaming server which informs each client of time-varying flow rate of transmitted data and causes for changing the flow rate.

SUMMARY

The present invention provides a data-streaming server transmitting multimedia data to a number of clients. The server determines a permissible flow rate to a client according to transmission-medium conditions as well as conditions at both the client's equipment and the data-streaming server. The server informs the client of causes of flow rate variations.

In accordance with one aspect, the present invention provides a method of informative data streaming. The method is implemented in a streaming server and comprises steps of: encoding, using an encoder coupled to the streaming server, a multimedia signal having a plurality of signals of different signal types according to a signal-specific encoding rate to produce multimedia data comprising a plurality of data components having a one-to-one correspondence to the plurality of signals; transmitting the multimedia data from the streaming server to a client over a telecommunication channel; and receiving feedback information from the client. The signal-specific encoding rate is initially set to a predefined value corresponding to a respective signal.

Quality metrics of the telecommunication channel are determined according to the feedback information, and a permissible bit rate for each signal is determined according to the quality metrics. The signal-specific encoding rate is then adjusted to a value not exceeding the permissible bit rate. A notification message indicating the quality metrics and the permissible bit rate is generated for each signal and superimposed on a selected signal from among the plurality of signals constituting the multimedia signal. Preferably, the notification message is superimposed on the multimedia signal during a time window following a relative change in the permissible bit rate exceeding a predetermined value. The duration of the time window is an operational parameter.

The method further comprises determining, for each signal, an indication of an acceptable bit rate of a decoder associated with the client and determining the respective initial value of the signal-specific encoding rate according to the acceptable encoding rate.

The method further comprises determining a mean value of the signal-specific encoding rate over successive observation intervals and, when the mean value is smaller than a respective predetermined threshold, an indication of the mean value is superimposed on the selected signal.

The multimedia data may comprise real-time-transport-protocol (RTP) packets and the feedback information may be acquired from real-time-transport-control-protocol (RTCP) packets received from said client.

In accordance with another aspect, the present invention provides a method of data streaming from an encoder of a streaming server to a decoder associated with a client of the streaming server. The method comprises steps of: establishing a connection from the encoder to the decoder; acquiring measurements characterizing the connection; estimating transmittance variation of the connection according to the measurements; and determining a favorable encoding rate of the encoder compatible with the transmittance variation.

Upon receiving a signal from a source, a flow controller of the streaming server instructs the encoder to encode the signal according to the favorable encoding rate. The flow controller determines a first difference between the favorable encoding rate and a previous encoding rate of the encoder. The value of the previous encoding rate may be initialized to a nominal encoding rate. When an absolute value of the first difference exceeds a predetermined first threshold, a first notification-display interval is determined and indications of the current encoding rate and the first difference are superimposed on the signal during the first notification-display interval and the value of the previous encoding rate is reset to equal the favorable encoding rate.

The method further comprises observing the signal over distinctly defined successive time intervals, determining a current frame rate of the encoder, and determining a second difference between the current frame rate and a previous frame rate. The previous frame rate is initialized to a nominal frame rate. When an absolute value of the second difference exceeds a predetermined second threshold, indications of the current frame rate and the second difference are superimposed on the signal, during a second notification-display interval and the previous frame rate is reset to equal the current frame rate.

The method further comprises extracting, from the measurements, an indication of current data-loss fraction and determining a third difference between the current data-loss fraction and an indication of a previous data-loss fraction. The indication of a previous data-loss fraction is initialized to zero. When an absolute value of the third difference exceeds a predetermined third threshold, indications of the current data-loss fraction and the third difference are superimposed on the signal, during a third notification-display interval and the previous indication of the data-loss fraction is reset to equal the current indication of data-loss fraction.

The method further comprises extracting, from the measurements, an indication of a current transfer delay between the encoder and the decoder and determining a fourth difference between the current transfer delay and a stored value of a previous transfer delay. The stored value of the previous transfer delay is initialized to zero. When an absolute value of the fourth difference exceeds a predetermined fourth threshold, indications of the current transfer delay and the fourth difference are superimposed on the signal, during a fourth notification-display interval and the previous indication of the transfer delay is reset to equal the current indication of transfer.

The method further comprises extracting, from the measurements, an indication of occupancy of a receiving buffer at the decoder and determining a fifth difference between the current occupancy and a stored value of a previous occupancy of the receiving buffer. The stored value of the previous occupancy is initialized to zero. When an absolute value of the fifth difference exceeds a predetermined fifth threshold, indications of the current occupancy and the fifth difference are superimposed on the signal, during a fifth notification-display interval and the previous indication of the occupancy is reset to equal the current indication of the occupancy.

The first, second, third, fourth, and fifth notification intervals do not overlap. The five notification intervals may be allocated in different time frames successively separated by an integer multiple of time-frame periods so that they may be displayed individually one at a time. Alternatively, the five notification intervals may be allocated within a common time frame so that they may be displayed ensemble.

In accordance with a further aspect, the present invention provides an informative streaming server computer, to be also referred to as streaming server. The server comprises: a signal-interface device communicatively coupled to a plurality of signal sources providing a plurality of signals of different signal types; a processor; and a computer readable medium storing executable instructions thereon. The instructions causes the processor to perform functions of: an overlay module for superimposing notification data on selected signals from among the plurality of signals; an adaptive encoder for receiving the plurality of signals from the overlay module and producing a plurality of data streams, having a one-to-one correspondence to the plurality of signals, according to a specified encoding rate for each signal of the plurality of signals; a probing module for generating probing packets; a network interface for transmitting the data streams and the probing packets to at least one client from among a plurality of clients and receiving response packets from the at least one client; and a flow controller. The flow controller analyzes the probing packets and the response packets to determine a permissible encoding rate for each signal and instructs the adaptive encoder to encode each signal according to the respective permissible encoding rate. The flow controller presents an indication of the new encoding rate to the overlay module for inclusion in the notification data superimposed on the signal.

The informative streaming server further comprises a selector coupled to the signal-interface device. The selector directs the selected signals to the overlay module and directs any remaining signals from the plurality of signals, not subject to notification overlay, directly to the adaptive encoder.

The encoder determines variations of a signal received from the overlay module over successive frame periods and produces encoded data representing the signal. The encoder communicates the encoded data to the client through the network interface. The encoder operates under constraint of a permissible bit rate received from the flow controller. The frame period is predetermined and provided to the encoder.

The computer readable medium further stores instructions which, when executed, cause the processor to determine mean values of bit rates of the encoded data over successive observation intervals and communicate a specific mean value of bit rate over an observation interval to the overlay module for inclusion in the notification data when the specific mean value is less than a predetermined fraction of the permissible bit rate. An observation interval comprises a predetermined integer multiple of a frame period.

According to an embodiment, the probing module stores instructions which, when executed, cause the processor to formulate real-time-transport-protocol (RTP) packets and interpret real-time-transport-control-protocol (RTCP) packets.

The adaptive encoder may comprise multiple encoding modules for producing the plurality of data streams, and a combining module for interleaving the data streams. Each encoding module encodes signals of a respective signal type. The signal types may include audio signals, video signals, still images, animations, and texts. The overlay module may comprise multiple overlay units, each for superimposing a notification compatible with a specific signal type.

BRIEF DESCRIPTION OF THE DRAWINGS

Embodiments of the present invention will be further described with reference to the accompanying exemplary drawings, in which.

DETAILED DESCRIPTION

Terminology

Figure 1:
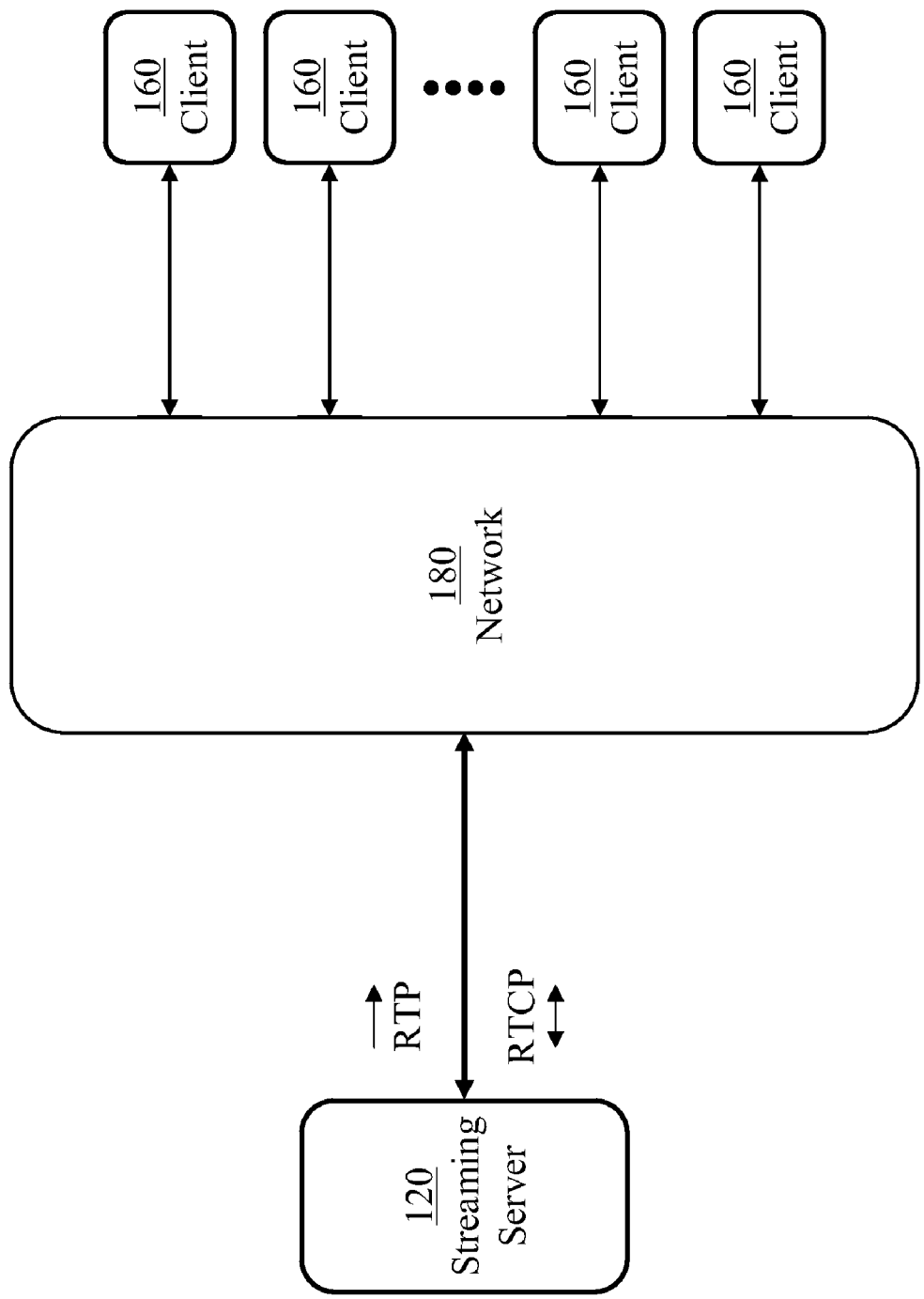
FIG. 1 illustrates a streaming server communicatively coupled to a number of clients, in accordance with an embodiment of the present invention.

Encoding rate: The bit rate of an encoded signal may fluctuate with time and the bit rate of the encoded signal is herein called encoding rate.

Adaptive encoder: An adaptive encoder is a device capable of encoding a signal to a specified maximum flow rate within a predefined flow-rate range. The encoding attempts to maximize encode-signal fidelity. The terms "encoder" and "adaptive encoder" are used synonymously hereinafter.

Nominal flow rate: A flow rate negotiated between a client and a streaming server, or determined automatically by a streaming server based on knowledge of client's equipment, is herein called a nominal flow rate.

Encoding coefficient: An encoding coefficient, denoted E, is a scaling factor which is multiplied by the nominal flow rate to determine a preferred flow rate compatible with a current state of a connection between a streaming server and a client.

Connection transmittance: The maximum flow rate which can be sustained by a connection from a streaming server to a client without violating preset transmission performance objectives is herein called a connection transmittance. The actual flow rate may be less than a connection's transmittance due to factors other than the physical path providing the connection.

Performance characteristic: Performance characteristics are defined herein as measurable connection properties such as transfer-delay variation, data-loss proportion, signal distortion, etc.

Statistic: A statistic is a value (such as a mean value) derived from a set of data samples.

Metric: A Metric is a measure of a quality of a path or a connection in a telecommunication network. A Metric may relate to a connection property such as latency, reliability, capacity, etc., of a path or connection within a path.

Downstream control packet: A control packet sent from a streaming server to a client is a downstream control signal.

Upstream control packet: A control packet sent from a client to a streaming server is an upstream control signal.

Frame period: A multimedia signal typically includes a video signal. A video signal is organized into frames of equal frame periods.

Observation interval: Feedback signals received at a streaming server from a client are preferably examined during observation intervals (observation periods) of appropriate durations to detect changes of connection state. The observation intervals (observation periods) may be successive or selected according to any other temporal order.

Operational parameters: The streaming server may store nominal values of system parameters such as encoding rates for different signal types, the length of an observation interval for determining a mean value of encoding rate, duration of each notification of a specific notification type, a specified period for optional periodic insertions of notification data, or the length of a frame period of a video signal. A connection request from a client may also specify operational parameters for the connection.

Gradient: Conventionally, the slope of a continuous function relating two variables is known as a gradient. In the case of a sampled function, the gradient may be approximated by determining the slope from a small number of samples. Herein, the gradient is the slope of measurement samples determined over a period covering a small number of samples.

Regression line: A straight line drawn through a set of data and determined according to some criterion, such as minimizing the sum of squares of data deviation from the straight line, is a regression line. The slope of a regression line may reliably indicate a trend of the data if the data dispersion meets certain conditions.

Real-time transport protocol (RTP): RTP defines a standardized packet format for delivering audio and video over the Internet (defined by the Internet Engineering Task Force (IETF), RFC 3550).

Real-time transport control protocol (RTCP): RTCP provides out-of-band control information for an RTP flow and is used periodically to transmit control packets in a streaming session. The primary function of RTCP is to provide feedback on connection quality.

FIG. 1 illustrates a streaming server 120, or a streaming server computer 120, communicatively coupled to a number of clients 160 through a network 180. The streaming sever 120 transmits multimedia signals to the clients 160 and receives feedback information from the clients. In accordance with one embodiment, the real-time-transport protocol (RTP) is used for downstream communications from the multimedia server 120 to the clients 160 and the associated real-time-control-transport protocol (RTCP) is used for exchanging control information between clients 160 and the streaming server 120.

Figure 2:
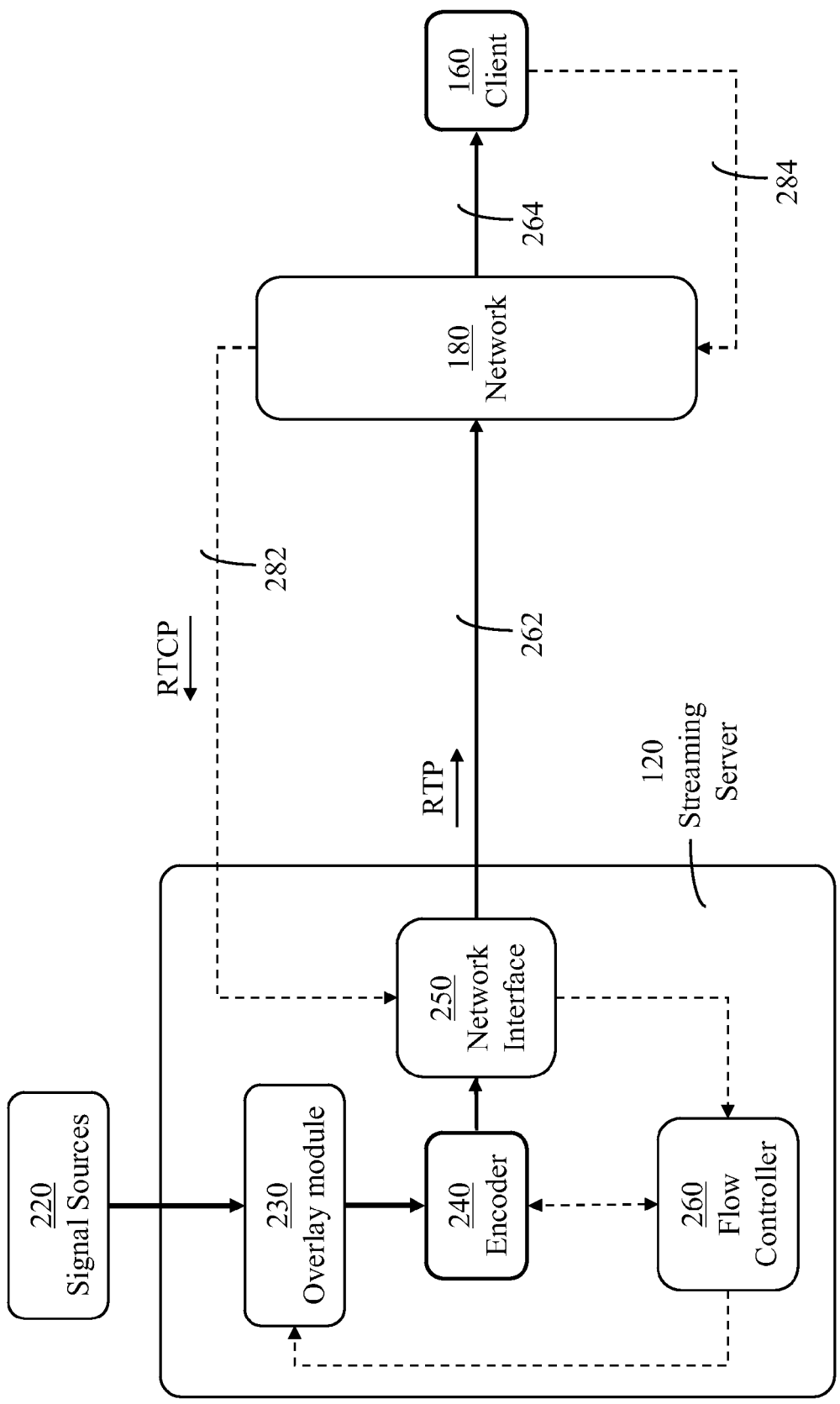
FIG. 2 details the streaming server and a connection to one of the clients, in accordance with an embodiment of the present invention.

FIG. 2 details the streaming server 120 and downstream communication with a client 160. The server 120 comprises an encoder 240 receiving multimedia signals from signal sources 220 either directly or through an overlay module 230. The overlay module 230 may superimpose information relevant to connection condition on multimedia signals received from the signal sources 220. A network interface 250 adapts encoded signals for transmission over a link 262 to network 180 and transmission from the network 180 to the client 160 over a link 264. The server 120 also includes a flow controller 260 for receiving feedback information from the client 160 through link 284 from the client 160 to the network 180 and link 282 from the network 180 to the flow controller 260 through network interface 250. The flow controller 260 is coupled to the encoder 240 and the overlay module 230. The flow controller 260 analyzes the feedback information to characterize the downstream connection traversing link 262, the network 180, link 264, and the client's equipment. The feedback information is categorized to indicate different performance aspects of the downstream connection. The flow controller 260 determines a permissible transmission rate over link 262 in accordance with the received feedback information. The encoder 240 encodes the multimedia signals received from the signal sources 220, either directly or through the overlay module 230, at encoding rates collectively not exceeding the permissible transmission rate determined according to the feedback information.

Figure 3:
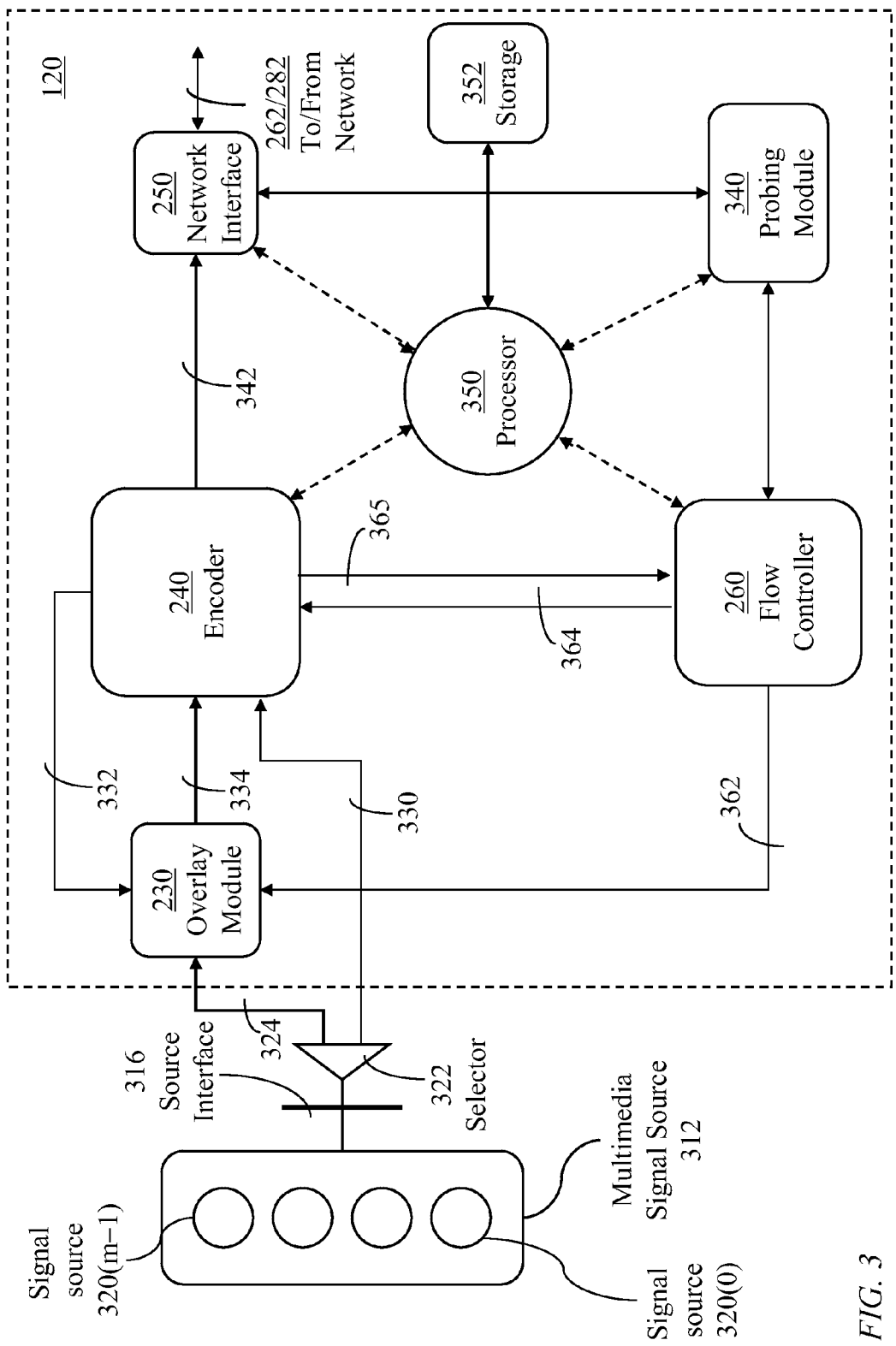
FIG. 3 illustrates components of the streaming server, in accordance with an embodiment of the present invention.

FIG. 3 illustrates further details of the informative streaming server 120. The streaming server 120 comprises a master processor 350 and a computer readable storage medium 352 having computer executable instructions stored thereon, which are organized into instruction sets, each instruction set stored in the computer readable medium forming a corresponding functional unit, or module of the streaming server 120. The functional units include overlay module 230, encoder 240, flow controller 260, a probing module 340, and network interface 250. The master processor 350 may comprise a number of processing units operating concurrently to share the processing workload.

The streaming server 120 has a source interface 316 for receiving multimedia signals from a multimedia signal source 312. The multimedia signal source 312 may have multiple signal sources 320 providing signals of different signal types, such as video, audio, animation, and text signals. The signal sources are individually identified as $320(j)$, $0 \leq j < m$, m being equal to four in the exemplary multimedia signal source 312.

Notably, a signal source 320 may comprise non-volatile memory devices, digital versatile discs (DVD), compact discs (CD), or floppy disks. A signal source 320, as illustrated in FIG. 3, may be a local source or may also be a representation of a data stream received from a remote streaming server (not illustrated) which is re-encoded in encoder 240 of the streaming server of FIG. 3 and is subject to notification overlay in overlay module 230 according to the methods described hereinafter.

The source interface 316 presents multimedia signals to encoder 240 either directly or through overlay module 230. A selector 322 connects the source interface 316 to either the overlay module 230 through link 324 or to the encoder 240 through link 330. A probing module 340 implements steps of a protocol for monitoring connection conditions. The network interface 250 combines probing data from probing module 340 with encoded signals received from encoder 240 over link 342 for transmission to a client 160 over link 262 to network 180. The network interface 250 receives feedback data from clients 160 through network 180 and link 282 and directs the feedback data to flow controller 260. The exchange of data among the components of the streaming server 120 uses methods well known in the art. Notably, the indicated paths between components of the informative streaming server 120 are logical paths within a computing device (streaming server 120).

The computer readable storage medium 352 associated with the streaming server 120 may comprise non-volatile memory devices, digital versatile discs (DVD), compact discs (CD), or floppy disks, having computer readable instructions stored thereon. The computer readable instructions are executed by the master processor 350 to cause the overlay module 230, the encoder 240, the flow controller 260, and the probing module 340 to perform the functions described hereinafter.

The streaming server 120 receives multimedia signals from at least one multimedia source 320 through a signal interface 316. The signal interface 316 is a device for acquisition of signals from local sources or remote sources. The signal interface 316 includes respective computer-executable instructions stored in a computer readable storage medium, and may be a separate entity or embedded in the streaming server. Only one multimedia source 312 is illustrated. The overlay module 230 superimposes notification data on the signals received from multimedia source 312 during selected time intervals. The notification data are produced primarily by flow controller 260, based on information received through network interface 250 and probing module 340 or encoder-state information received from the encoder 240 through link 365, and submitted to the overlay module 230 through link 362. However, the encoder may generate specific notification data related to waiting encoding tasks or variation of encoding rates due to signal time variation and submit the specific notification data directly to the overlay module 230 through link 332. The encoder 240 receives signals from the multimedia source 312 either directly through selector 322 and link 330 or through the overlay module 230 and link 334. The encoder 240 produces data streams having a one-to-one correspondence to the received signals. The setting of the selector 322 to connect to the encoder 240 or to the overlay module 230 may be included in a set of operational parameters of the streaming server 120 and may be signal specific. For example, selector 322 may direct video signals of a specific encoding scheme to the overlay module 230 while directing other signals directly to the encoder 240. Individual encoding rates for signals of different types may be specified as operational parameters. The flow controller 260 may adjust the individual permissible encoding rates according to connection conditions received through network interface 250 and current load conditions of the encoder 240 received through logical link 365. The flow controller instructs the encoder 240 to encode signals under the constraints of the permissible encoding rates. Concurrently, the flow controller 260 provides indications of the permissible encoding rates and relevant causes to the overlay module 230 for signals directed from the source interface (signal interface) 316 to the overlay module 230. The probing module 340 generates probing packets which may be combined with the output of encoder 240 in the network interface 250 or in a separate module.

The network interface 250 transmits data streams comprising payload data and probing data to clients 160. The network interface also receives data-streaming requests as well as response packets providing feedback information from clients 160. The flow controller 260 analyzes response packets and corresponding probing packets to evaluate connection conditions and determine a permissible encoding rate for each signal. The flow controller instructs the encoder 240, through logical link 364, to encode each signal according to a corresponding permissible encoding rate and presents an indication of new encoding rates to the overlay module 230 through logical link 362, for inclusion in the notification data to be superimposed on multimedia signals before encoding.

A multimedia signal may comprise signals of different signal types. The encoder 240 organizes video signals into frames of a specified frame period. The frame period may be entered as an operational parameter. The flow controller 260 may determine an adjusted frame period according to connection conditions or conditions at the encoder 240. The encoder 240 determines variations of a signal received from the overlay module over successive frame periods and produces encoded data, representing the signal, under constraint of a permissible bit rate received from the flow controller.

The computer readable medium 352 may also store tracking instructions which, when executed, cause said processor 350 to determine mean values of bit rates of encoded data over successive observation intervals, where each observation interval covers a predetermined integer multiple of a frame period. When a specific mean value of bit rate over an observation interval is found to be less than a predetermined fraction, for example ¼, of the permissible bit rate, an indication of the specific mean value is communicated to the overlay module 230 for inclusion in said notification data. The tracking instructions may be associated with the instruction set implementing the function of flow controller 260, or the instruction set implementing the function of the encoder 240.

The streaming server 120 implements a method of informative data streaming where a client 160 receiving multimedia data from the streaming server is informed of the encoding rate and causes of any changes of the encoding rate.

Multimedia source 312, which comprises a number $m \geq 1$ of signal sources 320 individually identified as 320(0) to 320(m−1), produces a multimedia signal having a plurality of signals of different signal types. The encoder 240 encodes the multimedia signal according to a signal-specific encoding rate, initially set to a respective predefined value. The predefined encoding rates may be provided within a set of operational parameters. The encoder 240 produces multimedia data comprising a plurality of data components having a one-to-one correspondence to the m signals 320(0) to 320(m−1).

The multimedia data is transmitted, through network interface 250, to a client 160 over a telecommunication channel 262. The network interface 250 receives feedback information from the client 160 and directs the feedback information to the flow controller 260. The flow controller 260 determines quality metrics of the telecommunication channel according to the feedback information and determines, for each signal of the m signals produced by signal sources 320(0) to 320(m−1), a permissible bit rate according to respective quality metrics. The flow controller 260 instructs the encoder 240, through logical link 364, to adjust each of the signal-specific encoding rates to a value not exceeding a respective permissible bit rate determined by flow controller 260. The flow controller 260 also produces notification signals each indicating the quality metrics and the permissible bit rate for each signal and presents the notification signals to the overlay module 230 through logical path 362. The overlay module 230 superimposes the notification signals on the multimedia signal.

The feedback information received from a client 160 may include an indication of an acceptable signal-specific bit rate of a decoder associated with the client equipment. The flow controller 260 uses the acceptable signal-specific bit rate to determine respective initial values of the signal-specific encoding rates.

The encoder 240 comprises computer-executable instructions stored in a computer readable storage medium, which determine a mean value of the signal-specific encoding rate over successive observation intervals, as will be described with reference to FIG. 8. The length of an observation interval may be set as an operational parameter. When the encoder determines that the mean value is smaller than a predetermined threshold corresponding to a given signal from among the m signals constituting the multimedia signal, the encoder informs the overlay module 230 (through logical path 332) of an indication the mean value to be superimposed on the multimedia signal before encoding.

The multimedia data may be organized according to any desired data structure. It is convenient, however, to use standardized structures such as the real-time-transport-protocol (RTP) packets. Likewise, the feedback information from clients 160 may be structured arbitrarily, but it is preferable to use a standardized structure such as that of the real-time-transport-control-protocol (RTCP).

The superposition of informative signals over the multimedia signal may be activated during a time window following a significant relative change in the permissible bit rate where a relative change is considered to be significant when it exceeds a predetermined value.

Figure 4:
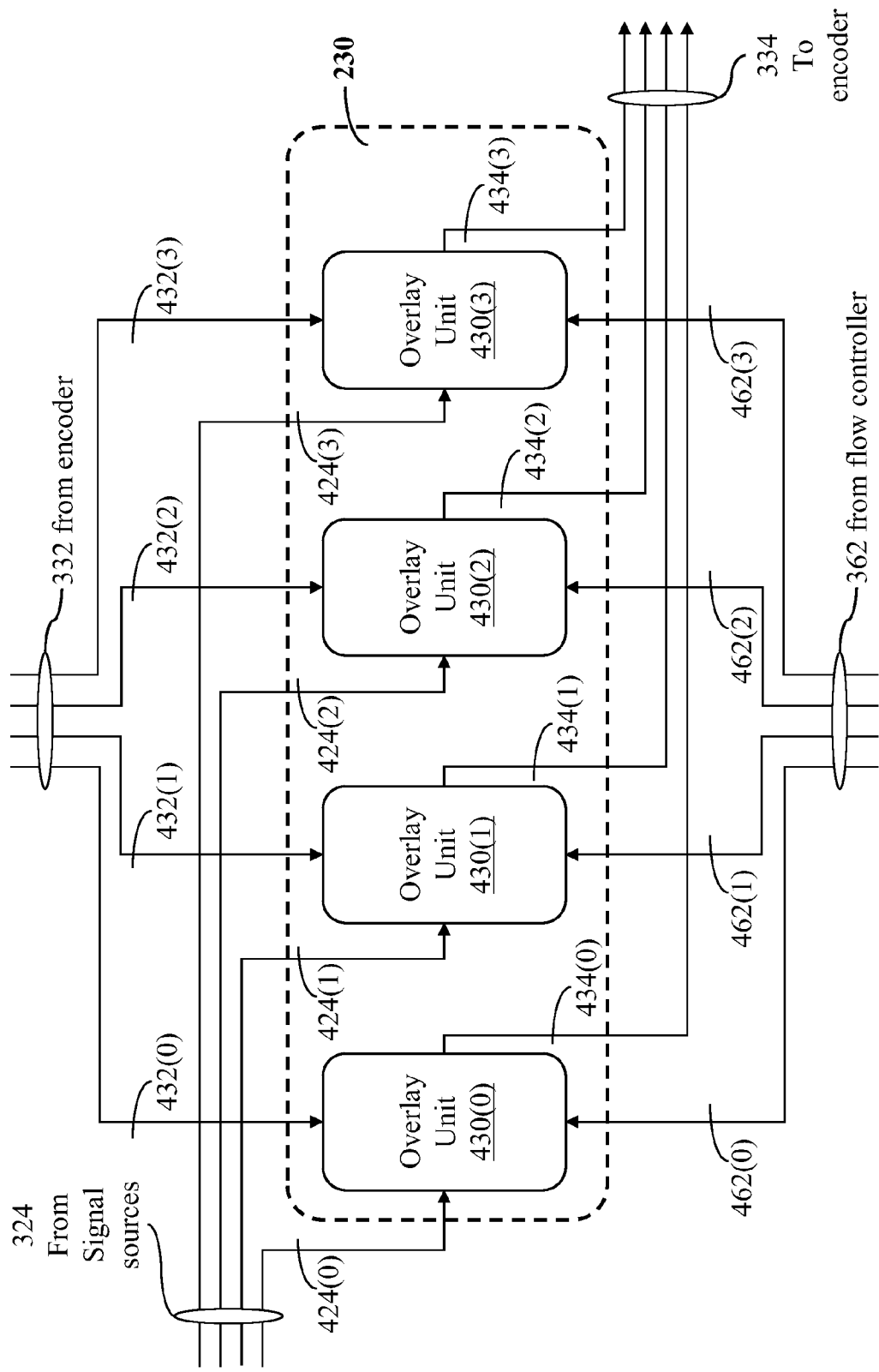
FIG. 4 illustrates an overlay module in the streaming server of FIG. 3, the overlay module comprising multiple overlay units, in accordance with an embodiment of the present invention.

The overlay module 230 may comprise multiple overlay units each for superimposing a notification compatible with a specific signal type. An overlay module comprises a set of computer-executable instructions stored in computer readable storage medium, which are applicable for overlaying notification data for a signal of a specific type. FIG. 4 illustrates an exemplary overlay module 230 comprising four overlay units 430 individually identified as 430(0), 430(1), 430(2), and 430(3) for overlaying notification data on signals of different signal types.

As illustrated in FIG. 3, an overlay module 230 receives signals from a multimedia signal source 312 through source interface 316, selector 322, and link 324. Link 324 may carry a multiplex, temporal or spatial, of several signals. FIG. 4 illustrates a link 324 having four logical paths 424, individually identified as 424(0), 424(1), 424(2), and 424(3) to overlay units 430(0), 430(1), 430(2), and 430(3), respectively.

An overlay module 230 receives notification data from flow controller 260 through link 362 (FIG. 3). Link 362 may carry a multiplex, temporal or spatial, of several notification types. FIG. 4 illustrates a link 362 from flow controller 260 having four logical paths 462, individually identified as 462(0), 462(1), 462(2), and 462(3) to overlay units 430(0), 430(1), 430(2), and 430(3), respectively.

An overlay module 230 may also receive specific notification data from encoder 240 through link 332 (FIG. 3). Link 332 may carry a multiplex, temporal or spatial, of several signal-specific notification types. FIG. 4 illustrates a link 332 from encoder 240 having four logical paths 432, individually identified as 432(0), 432(1), 432(2), and 432(3) to overlay units 430(0), 430(1), 430(2), and 430(3), respectively.

An overlay module 230 sends signals combining payload signals originating from multimedia signal source 312 and respective notification data, if any, to encoder 240 through link 334 (FIG. 3). Link 334 may carry a multiplex, temporal or spatial, of several signals. FIG. 4 illustrates a link 334 comprising four logical paths 434, individually identified as 434(0), 434(1), 434(2), and 434(3) from overlay units 430(0), 430(1), 430(2), and 430(3), respectively, to encoder 240.

Figure 5:
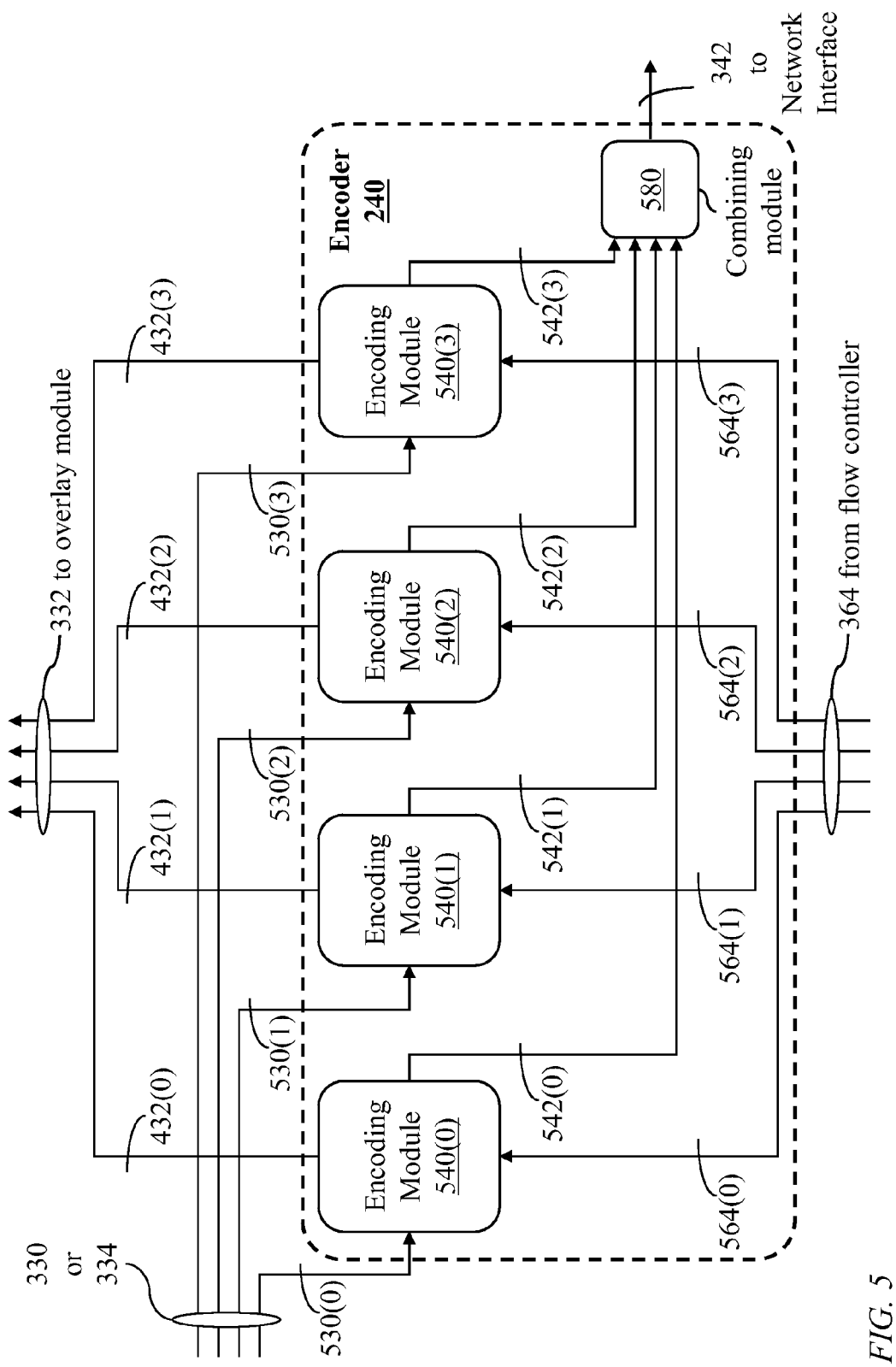
FIG. 5 illustrates an adaptive encoder in the streaming server of FIG. 3, the adaptive encoder comprising multiple encoding modules, in accordance with an embodiment of the present invention.

An encoder 240 may comprise several encoding modules for encoding signals of different types. FIG. 5 illustrates an exemplary encoder 240 having four encoding modules 540 individually identified as 540(0), 540(1), 540(2), and 540(3), each for encoding signals of a respective signal type. Encoder 240 receives signals through either link 330 or link 334. In the exemplary encoder 240 of FIG. 5, either link 330 or link 334 may comprise four logical paths each carrying a signal originating from multimedia signal source 312. Notably, any of the four paths, individually identified as 530(0), 530(1), 530(2), and 530(3) may belong to either link 330 or link 334. For example, paths 530(0) and 530(1) may be paths 434(0) and 434(1) of FIG. 4, carrying signals with superimposed notification data inserted in overlay module 230 while paths 530(2) and 530(3) may carry signals in their original forms without inserted notifications.

The encoder 240 receives instructions from flow controller 260 through link 364. In the exemplary encoder 240 of FIG. 5, link 364 comprises four logical paths 564, individually identified as 564(0), 564(1), 564(2), and 564(3) directed to encoding modules 540(0), 540(1), 540(2), and 540(3), respectively.

As described with reference to FIG. 4, encoder 240 may send specific notification data to overlay module 230 through link 332 (FIG. 3) which has four logical paths 432(0), 432(1), 432(2), and 432(3) to overlay units 430(0), 430(1), 430(2), and 430(3), respectively. The logical paths 432(0), 432(1), 432(2), and 432(3) originate from encoding modules 540(0), 540(1), 540(2), and 540(3), respectively. An encoding module 540(j), $0 \leq j < 4$, may process an original signal, received over link 330, or an annotated signal received over link 334 and designated to carry notifications; only a logical path 432(j), $0 \leq j < 4$, from encoding modules 540(j) handling an annotated signal is actually used. An annotated signal is a signal from one of signal sources 320(0) to 320(*m*−1) on which notification data are superimposed in overlay module 230.

Each encoding module 540(*j*), $0 \leq j < 4$, produces an individual data stream 542(*j*), $0 \leq j < 4$, of a respective type (for example, a data stream representing an audio signal, a video signal, a text, etc.). The four data streams 542(*j*), $0 \leq j < 4$, are interleaved in a combining module 580 to produce a multimedia stream presented to network interface 250 through link 342. The combining module 580 interleaves encoded signals of different types according to any of interleaving methods known in the art. The signal types may include all, or a subset of, an audio signal, a video signal, a still image, an animation, and a text.

Figure 6:
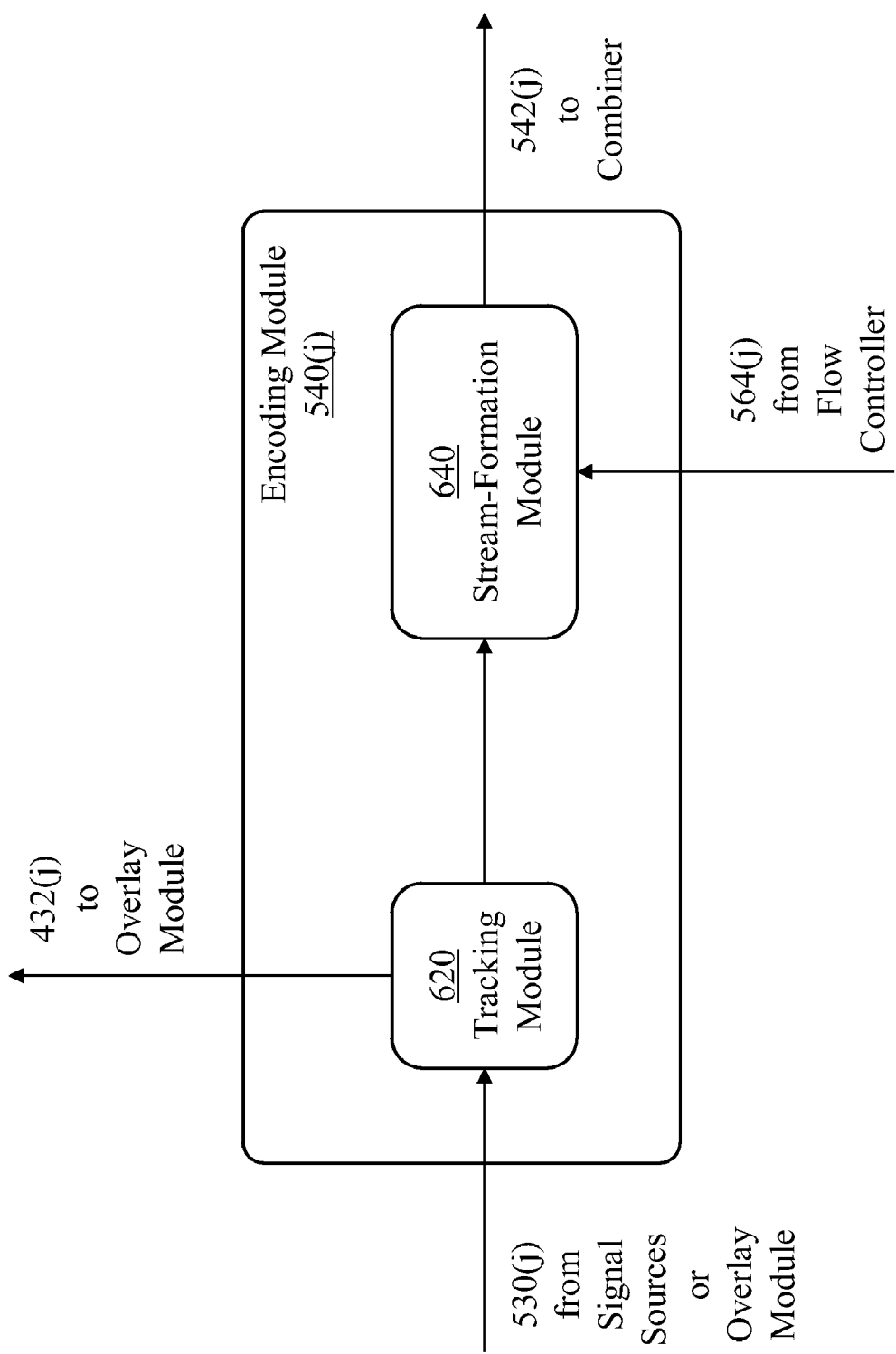
FIG. 6 illustrates an encoding module in the adaptive encoder of FIG. 5, the encoding module comprising a tracking module and a stream-formation module, in accordance with an embodiment of the present invention.

FIG. 6 illustrates one of encoding modules 540(*j*), $0 \leq j < 4$, comprising a tracking module 620 and a stream-formation module 640. The index "j" in FIG. 6 identifies an encoding module 540(*j*) devised for signal encoding techniques which capture signal variations over consecutive time frames and produces a data stream accordingly. Encoding modules employing other encoding techniques may have different structures.

The tracking module 620 receives a signal over path 530(*j*), illustrated in FIG. 5, and determines signal variation over a designated period of time, such as a frame time of a video signal. The tracking module 620 produces an intermediate signal capturing signal variations. The tracking module 620 may report indications of unusually low signal variations, through a path 432(*j*), to overlay module 230 which may superimpose a respective notification as described above. The stream-formation module 640 processes the intermediate signal received from tracking module 620, under an encoding-rate constraint received from flow controller 260 over logical path 564(*j*), to produce a data stream 542(*j*) to be offered to combining module 580.

Figure 7:
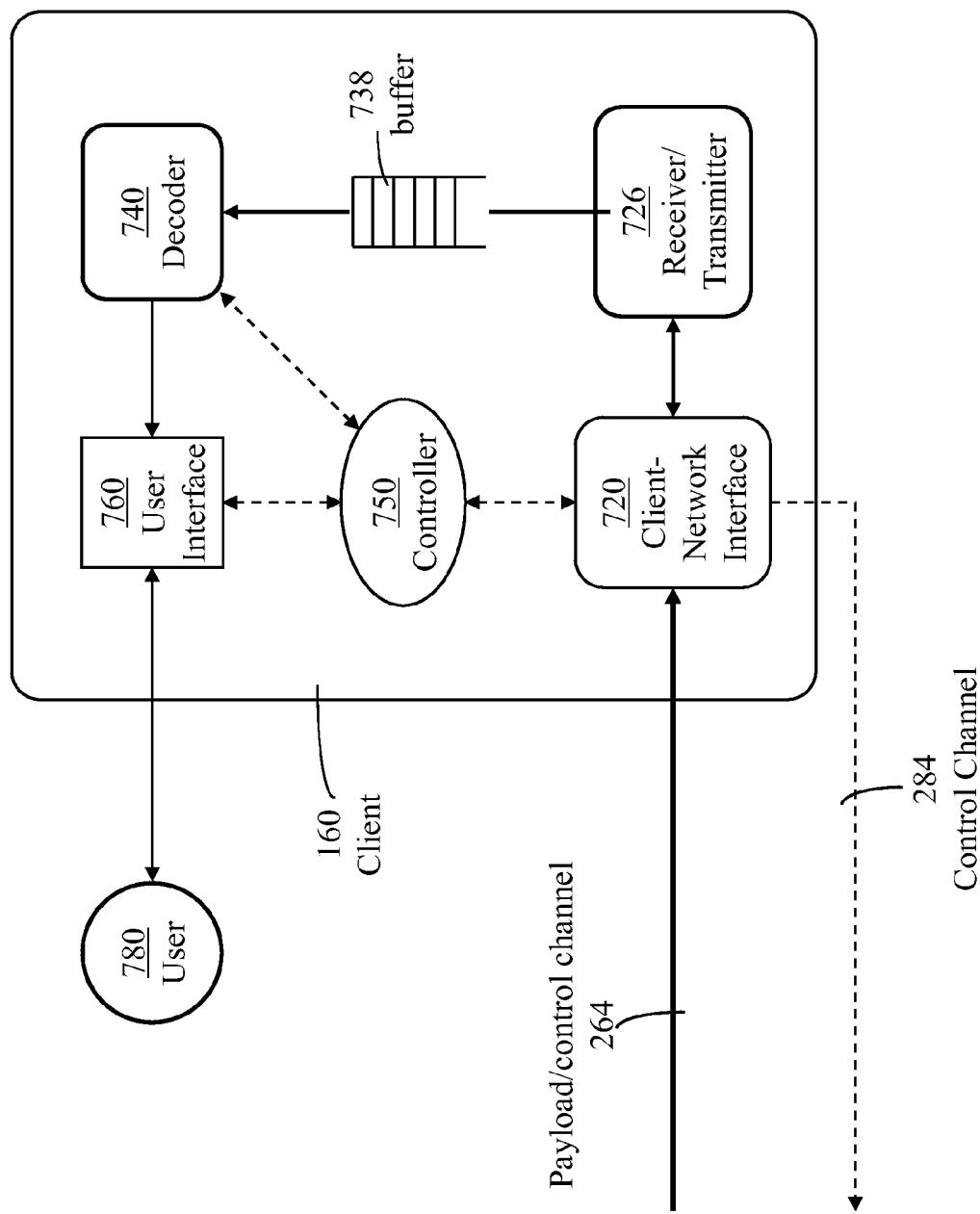
FIG. 7 illustrates a decoder associated with a client, in accordance with an embodiment of the present invention.

FIG. 7 illustrates exemplary client equipment comprising a client-network interface 720 for receiving a carrier signal from link 264 and presenting the received carrier signal to a receiver-transmitter 726 which demodulates the carrier signal to extract multimedia data sent from the streaming server 120. Packets of the demodulated multimedia data are placed in a buffer 738 at input of a decoder 740. The decoder 740 and buffer 738 are operated under control of client controller 750. The decoder 740 processes the multimedia data to produce signals, such as acoustic signals, video signals, animation-display signals, text codes, etc., suitable for presentation to a user 780 through a user interface 760. Feedback information is transmitted to the streaming server 120 through client-network interface 720 and channel 284.

Figure 8:
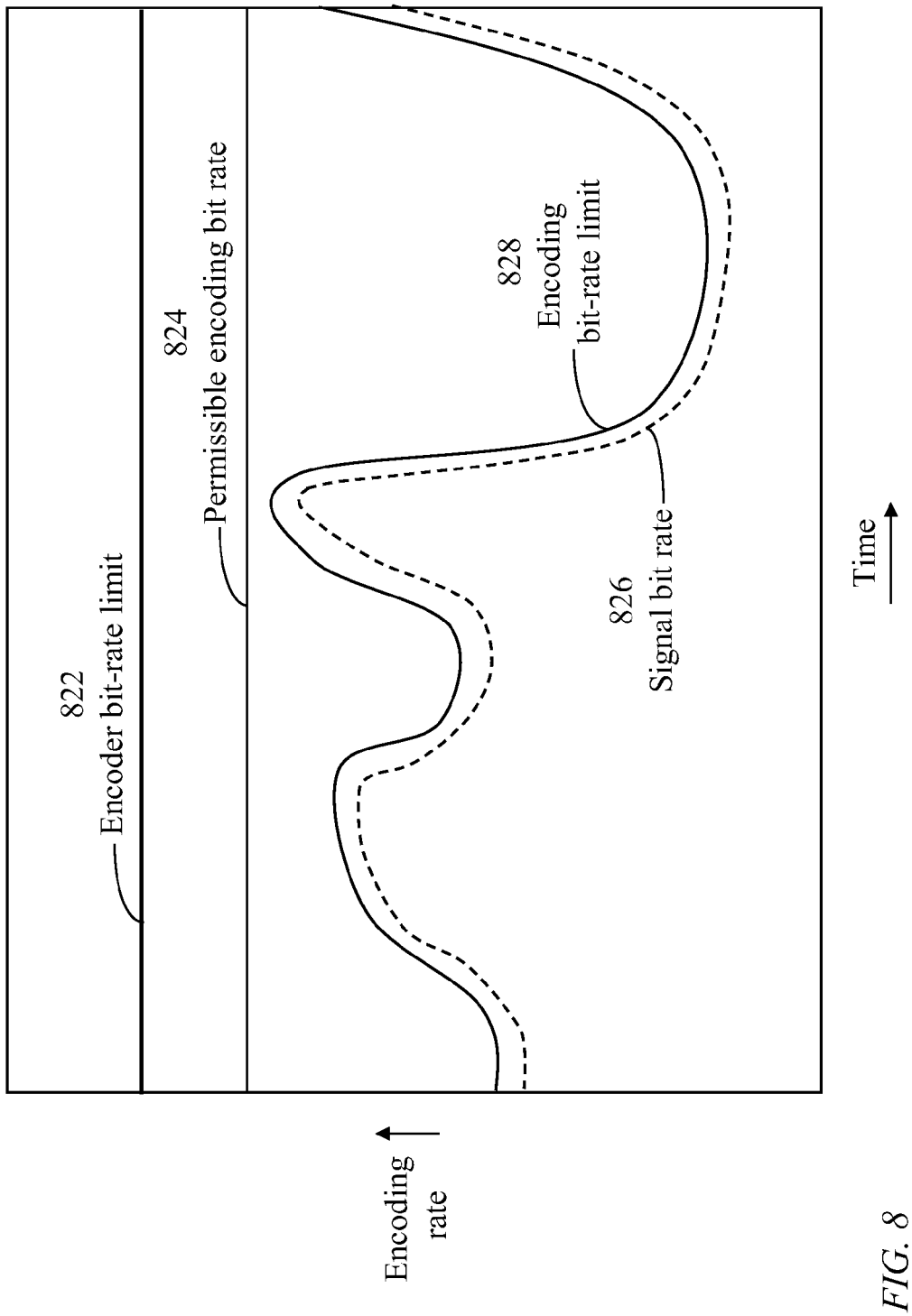
FIG. 8 illustrates temporal variation of encoding rate of a signal for use in an embodiment of the present invention.

FIG. 8 illustrates temporal variation of encoding rate of an exemplary signal constituting a component of a multimedia signal. In the example of FIG. 8, the permissible encoding rate 824 is determined by the flow controller 260 to be lower than the encoder's bit-rate limit 822. The signal is encoded at a rate which depends on the signal's temporal variation, or equivalently the signal's spectral content, as viewed over a suitable observation time interval. For example, a video signal received from a source and organized in time frames may be encoded to retain only frame-to-frame changes and corresponding pointers to encoded signal portions. Thus, the signal bit rate 826 required for proper reproduction of the source's video signal may vary with time. The encoding bit rate 828 may be slightly higher than the required signal bit rate 826 due to encoding overhead. When the encoding rate is low for an extended period of time due to small frame-to-frame variation, it is desirable to inform a respective client of the reason. For example, if the encoding rate is less than ¼ of the permissible encoding rate for a period of more than a minute, and assuming that a user 780 (FIG. 7) has means for determining received bit rate, a notification may be sent informing the user 780 that the low encoding rate is caused by the slow variation of the signal, rather than transmission conditions, encoder capability, or encoder overload.

Several disciplines of operating the data streaming system of FIG. 2 may be devised within the operational capabilities of the streaming server 120 and client equipment 160. The streaming server 120 receives a connection request from a client 160 through network interface 250. After establishing a connection from encoder 240 of streaming server 120 to decoder 740 of a client 160, the streaming server accesses a multimedia signal source 312 through source interface 316. The next step is to acquire measurements characterizing the connection and estimate transmittance variation of the connection based on the measurements. As defined above, the transmittance of a connection is the maximum flow rate which can be sustained by the connection from the streaming server 120 to a client 160 without violating preset transmission performance objectives. A permissible encoding rate for each constituent signal of the multimedia signal, compatible with the transmittance variation, is then determined.

Figure 9:
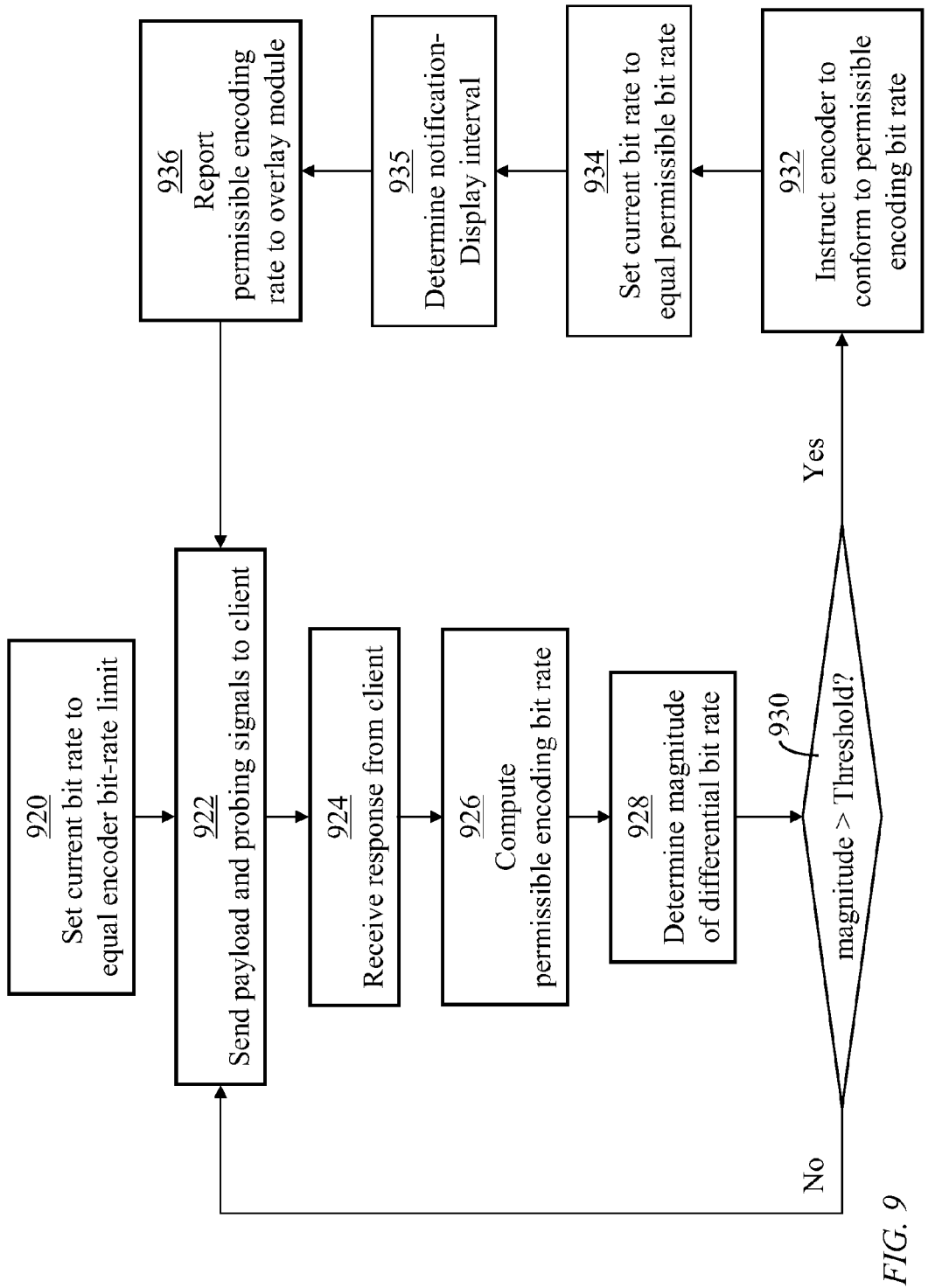
FIG. 9 illustrates a process of determining a permissible encoding rate of a signal, according to connection characterization, and overlaying an indication of the permissible encoding rate on the signal, in accordance with an embodiment of the present invention.

FIG. 9 illustrates a process of determining a permissible or favorable encoding rate of a signal according to connection characterization and overlaying an indication of the permissible encoding rate on the signal. The encoder 240 receives a signal from a signal source and initially sets a current encoding bit rate for the signal to equal an encoder-defined limit (step 920). The encoder 240 sends the encoded signal to the network interface 250. The probing module 340 generates a probing signal and sends the probing signal to the network interface 250. The network interface 250 combines the probing signal with the encoded signal and transmits the resulting signal (step 922) to the receiver 726 of client 160 through links 262 and 264. The flow controller 260 receives feedback information from the client through link 282 (step 924). The feedback information includes, amongst other information, measurements that characterize the transmittance of the established connection.

The flow controller 260 computes a permissible encoding rate for the signal (step 926) and determines a difference between the permissible encoding rate and the current encoding rate (step 928). If the magnitude of the difference does not exceed a predefined value, as determined in step 930, the current encoding rate remains unchanged and step 922 is revisited to send a new signal to the client. Otherwise, when the magnitude of the difference exceeds the predefined value, the flow controller 260 instructs the encoder 240 to modify the encoding rate according to the permissible encoding rate (step 932) and simultaneously instructs the overlay module 230 to insert an indication of the change in encoding rate in the signal received from the signal source 220 so that the encoder 240 encodes the combined signal (step 936). Step 922 is then revisited. The current bit rate is set to equal the permissible bit rate for future reference (step 934). The flow controller may also determine a notification-display interval (step 935) during which the indication of encoding-rate change is to be inserted.

The process of FIG. 9 results in displaying indications of encoding-rate changes at a client's display device having a display screen or other means for presenting notification information. It may also be desirable to display other details associated with encoding-rate changes using the client's display device. For example, an encoding-rate change of a video signal may be realized by changing the frame rate. A display of frame-rate change may only be warranted when the change is significant. Thus, a second difference between a current frame rate, corresponding to the permissible encoding rate, and a previous frame rate is determined and display of frame-rate change is triggered when a magnitude of the second difference exceeds a certain value. The frame-rate display may appear together with the encoding-rate display at the client's display device. Alternatively, the frame-rate display may succeed the encoding-rate display after a sufficient interval so that at most one of the two displays is present at a given time. Thus, a second notification-display interval, not overlapping the first notification-display interval, is selected so that the two notification-display intervals are either in a same frame or in separate frames.

It may also be desirable to display a cause of encoding-rate change. Thus, a current data-loss fraction may be determined from the measurements, and a third difference between the current data-loss fraction and a previous data-loss fraction is determined. Where an absolute value (magnitude) of the third difference exceeds a predetermined third threshold, a third notification-display interval is determined, during which indications of the current data-loss fraction and the third difference are superimposed on the multimedia signal at overlay module 230. An indication of the previous data-loss fraction is updated to equal the current data-loss fraction for use in deciding future notifications.

Likewise, a current transfer delay between the streaming server 120 and a client 160 may be determined from the measurements and a fourth difference between the current transfer delay and a previous transfer delay may be determined. Where the magnitude of the fourth difference exceeds a predetermined delay-variation threshold, a fourth notification-display interval is selected for inserting indications of the current transfer delay and the fourth difference at overlay module 230. The indication of the previous transfer delay is updated to equal current transfer delay for use in deciding future notification displays.

A current occupancy of a receiving buffer at the decoder may be determined from the measurements extracted from the feedback information. A fifth difference between the current occupancy and a previous occupancy of the receiving buffer is then determined. Where the magnitude of the fifth difference exceeds a predetermined occupancy-variation threshold, a fifth notification-display interval is selected for superimposing on the multimedia signal indications of the current occupancy and the fifth difference. An indication of the previous occupancy is updated to equal the current occupancy for use in deciding future notification displays.

The above notification displays are only exemplary. Other notifications may be of interest and the overlay module 230 may be instructed to superimpose only a subset of available notification data.

If all the five notifications are selected, then the first display-notification interval, the second display-notification interval, the third display-notification interval, the fourth display-notification interval, and the fifth display-notification interval may be either allocated in different time frames, successively separated by an integer multiple of time-frame periods to appear at different times on a display device, or allocated within a common time frame to appear together on the display device.

The overlay module 230 may insert notifications of encoding rate change and other related notifications in response to detecting a significant encoding-rate change. Alternatively, the overlay module 230 may insert the notifications periodically, for example after every specified period, where a specified period may be defined in time units (20 seconds for example) or defined in terms of a number of successive frames, one thousand frames for example. The specified period may be included in operational parameters stored in the storage medium 352 or any other memory device.

Figure 10:
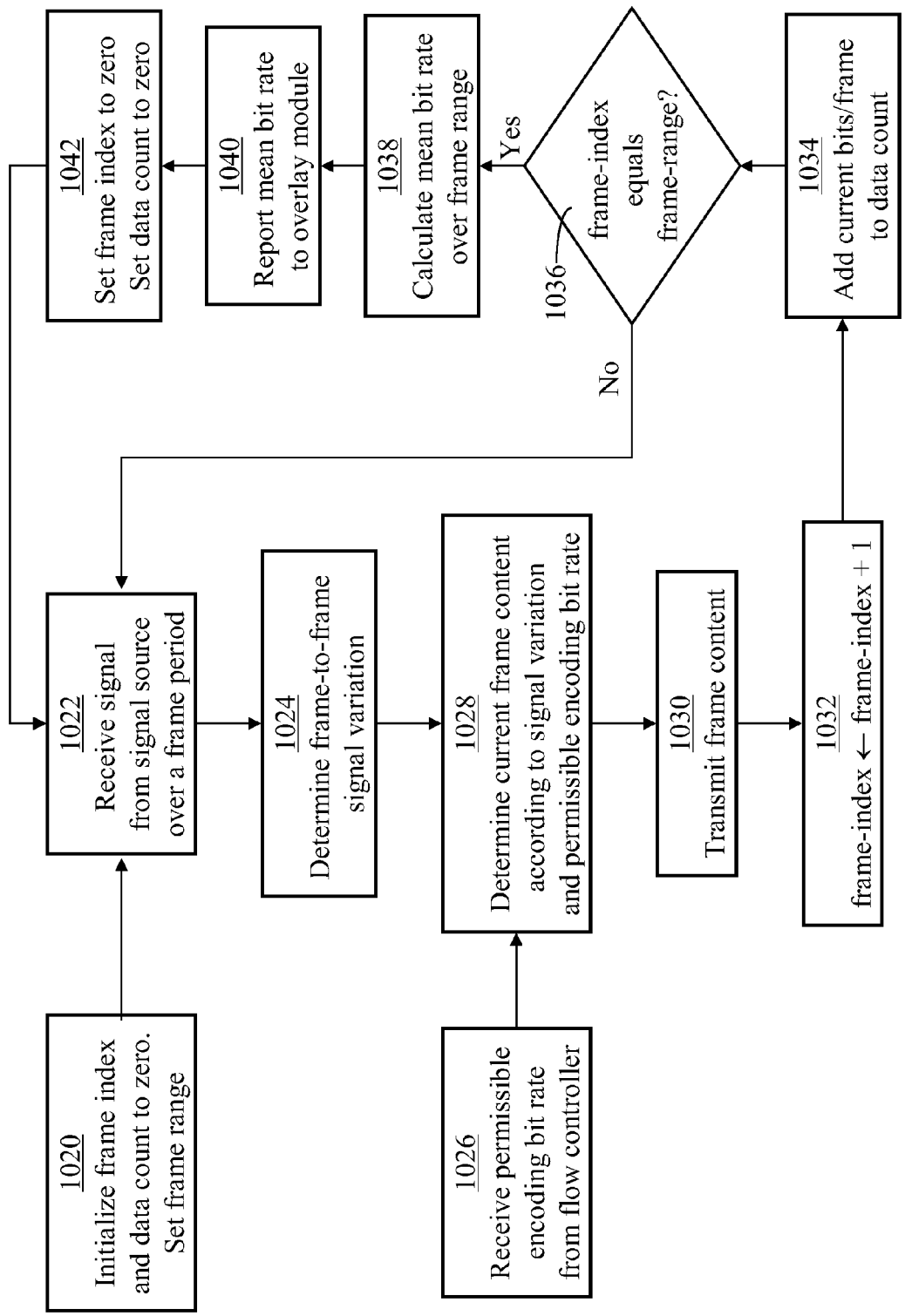
FIG. 10 illustrates a process of tracking temporal variation of an encoding rate of a signal and overlaying an indication of the temporal variation on the signal, in accordance with an embodiment of the present invention.

FIG. 10 illustrates a process of tracking temporal variation of an encoding rate of a signal (FIG. 8) and overlaying an indication of the temporal variation on the signal. The tracking process may be implemented according to computer readable instructions stored in a memory device, which may be part of the storage medium 352. The instructions may be executed to cause processor 350 to implement the steps of FIG. 10. The instructions may be included within the encoder instruction set of encoder 240 or within the flow controller instruction set of flow controller 260.

A video signal is organized into frames and displayed at a predetermined frame rate, such as 40 frames per second. Video encoding may be performed according to any of several standardized methods. Typically, only variations between successive frames are transmitted to destination. Thus, the transmitted data varies according the video signal temporal variation. It is useful to inform a client receiving an encoded video signal of the encoding rate at source. The mean encoding rate may be measured over predefined intervals, each interval covering a frame range having an integer number of frames. The number of data units sent over an interval may be used to determine a mean encoding rate over the interval. A data unit may be selected to be a bit, a byte, or a specified number of bytes. To determine the actual encoding rate, a cumulative number of data units send over a predefined frame range is determined. To start, a frame index is initialized to zero and a data count is set to equal zero (step 1020). A video signal is received from a signal source (step 1022) and signal variations between successive frames are determined (step 1024). Encoded data over a current frame period is determined (step 1028). The encoded data over the current frame period is determined under a constraint of a permissible encoding rate received from the flow controller 260 (step 1026). The encoded data over the current frame period is transmitted to a respective client 160 (step 1030) and the frame index is increased by 1 (step 1032). The size of encoded data (in bytes for example) is added to the data count (step 1034). If the frame index is less than the predefined frame range (step 1036), step 1022 is revisited to continue receiving the video signal over a subsequent frame period. Otherwise, if the frame index equals the predefined frame range, the mean bit rate over the frame range is determined (step 1038) as a ratio of data count (in bits) to duration of a frame range. The mean bit rate is communicated to the overlay module 230 (step 1040). The frame index is reset to equal zero (step 1042), to start determining a data count over a new frame range, and step 1022 is revisited to continue receiving the video signal over a subsequent frame period.

Figure 11:
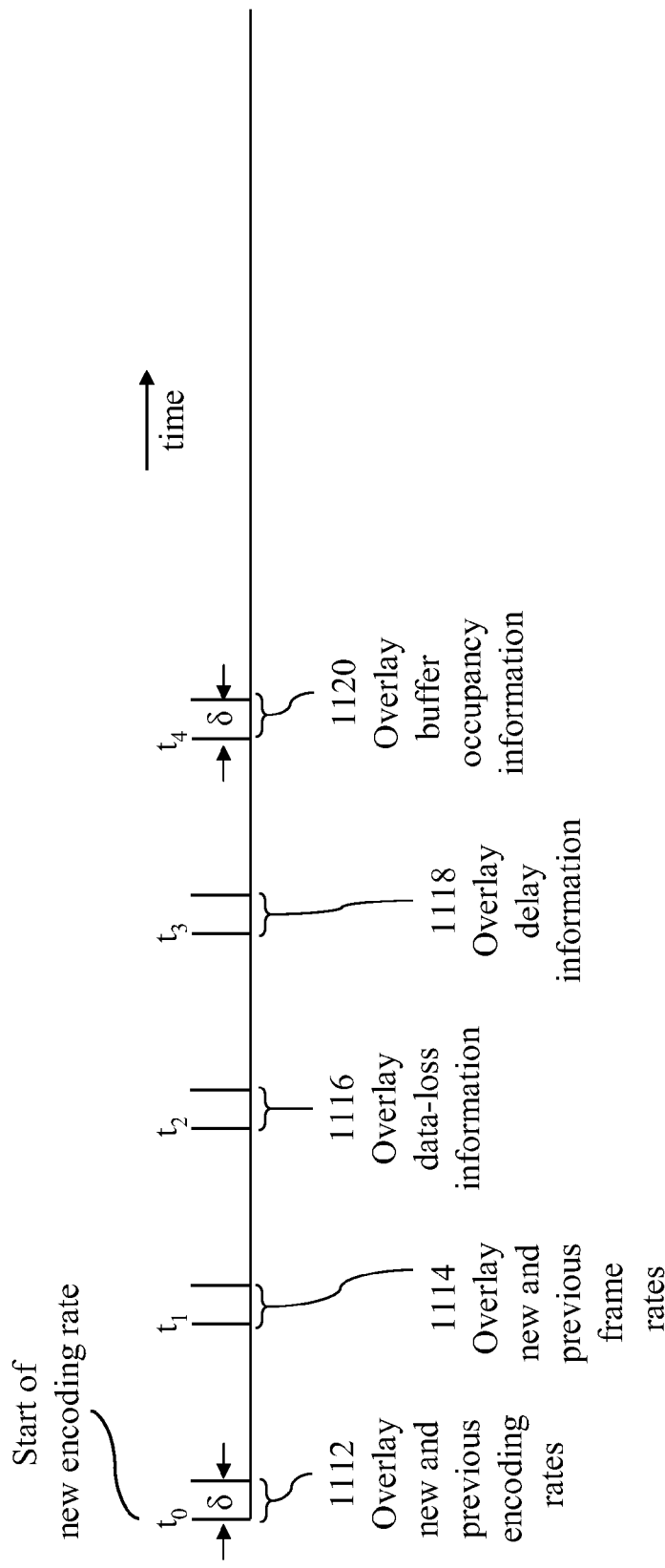
FIG. 11 illustrates allocation of notification-display intervals, in accordance with an embodiment of the present invention.

FIG. 11 illustrates allocation of notification-display intervals. Five display intervals 1112, 1114, 1116, 1118, and 1120 starting at time instants $t_0, t_1, t_2, t_3,$ and $t_4$ and having durations of $\delta_0, \delta_1, \delta_2, \delta_3,$ and $\delta_4$ are illustrated. A time instant $t_j$, $0 \leq j < 5$, determines a position within a frame, i.e., a position on a display screen, at which a first point of a corresponding notification starts. A duration $\delta_j$, $0 \leq j < 5$, determines an area within a displayed frame, i.e. an area on a display screen, occupied by a corresponding notification. The overlay module 230 superimposes notifications related to change of encoding rates during interval 1112, notification relevant to frame rates during interval 1114, notifications relevant to data loss during interval 1116, notifications relevant to transfer delay during interval 1118, and notifications relevant to client's buffer occupancy during interval 1120. The above intervals and corresponding notifications are exemplary. An arbitrary number of notifications and corresponding durations may be allocated subject to constraints regarding a permissible ratio of notification data to payload data. Each interval occupies a small fraction, for example less than 0.01, of a frame period. Thus, for a video signal, each notification occupies a small fraction of a display-screen area.

In one embodiment, the five intervals may be allocated in one frame and repeated for several frames. For example, at a frame rate of 40 frames per second, allocating the display intervals in 80 successive frames results in the notifications appearing on a display device (a screen) for two seconds. In another embodiment, the first display interval $\delta_0$ is allocated in each of a first number of successive frames then the second display interval $\delta_1$ is allocated in each of a second number of frames, and so on. For example, each of the five intervals may be individually allocated in 80 successive frames so that the corresponding notifications would appear on a display device in five successive periods of two seconds each.

Several other variations of arranging the display intervals may be devised. For example, two display intervals may be allocated in a number of consecutive frames and three display intervals may be allocated in a subsequent number of frames.

The five notification types described above are only exemplary. It may be desirable to limit the number of notifications related to connection conditions to include, for example, notifications related only to data-loss and transfer delay. Thus, after allocating a notification-display interval to report encoding-rate change, an additional notification-display interval may report both data-loss and transfer-delay conditions.

Thus, a signal may be observed over distinctly defined successive time intervals (for example time intervals of one second each) and feedback information may be analyzed to extract a current data-loss fraction and a current transfer delay between the streaming server and the client.

A first relative difference between the current data-loss fraction and a previous data-loss fraction and a second relative difference between the current transfer delay and a previous transfer delay are determined. If an absolute value of either the first relative difference or the second relative difference exceeds a predetermined variation threshold (for example of a relative magnitude of 0.2), then indications of the current data-loss fraction, the first relative difference, the current transfer delay and the second relative difference may be superimposed on the signal during the additional notification-display interval. The value of the previous data-loss fraction is then updated to equal the current data-loss fraction and the value of the previous transfer delay is updated to equal the value of the current transfer delay.

As defined above, an encoding coefficient, denoted E, is a scaling factor which is multiplied by a nominal flow rate to determine a preferred flow rate compatible with a current state of a connection between a streaming server and a client. A permissible value of an encoding coefficient E for a connection is determined according to feedback information from a client. The encoding coefficient E is initially set to equal 1.0, i.e., the encoding rate is the nominal encoding rate specified when the connection is initially setup. The encoder 240 naturally produces data at rates which vary according to the nature of the encoded signal as illustrated in FIG. 8. The encoding coefficient E, however, causes the encoder to independently modify its maximum output flow rate regardless of the dynamics (the fluctuating bit rate) of the encoded signal. The flow controller 260 extracts connection measurements from the feedback data.

The mean values of measurements, over successive or overlapping time windows, may be used to determine a new value of the encoding coefficient E. A statistic based on a mean value of measurements taken over a time window and corresponding to a specific connection characteristic, such as transfer delay or data-loss, is compared with a predefined acceptable reference value of the specific connection characteristic. When the statistic exceeds the reference value by a significant amount, the encoding coefficient is reduced and, consequently, the encoding rate is decreased below the nominal flow rate. If the statistic is below the reference value by a significant amount, the encoding coefficient may be increased. Thus, two bounds $\mu_1$ and $\mu_2$, $\mu_1 < \mu_2$, corresponding to the specific characteristic, may be defined. The encoding coefficient is increased when the statistic is below $\mu_1$ and decreased when the statistic exceeds $\mu_2$. The selection of the gap ($\mu_2 - \mu_1$) is critical. A very small gap may result in unnecessary rapid flapping between low values and higher values. A very large gap may result in slow response, or even no response, to significant connection-condition variations.

Figure 12:
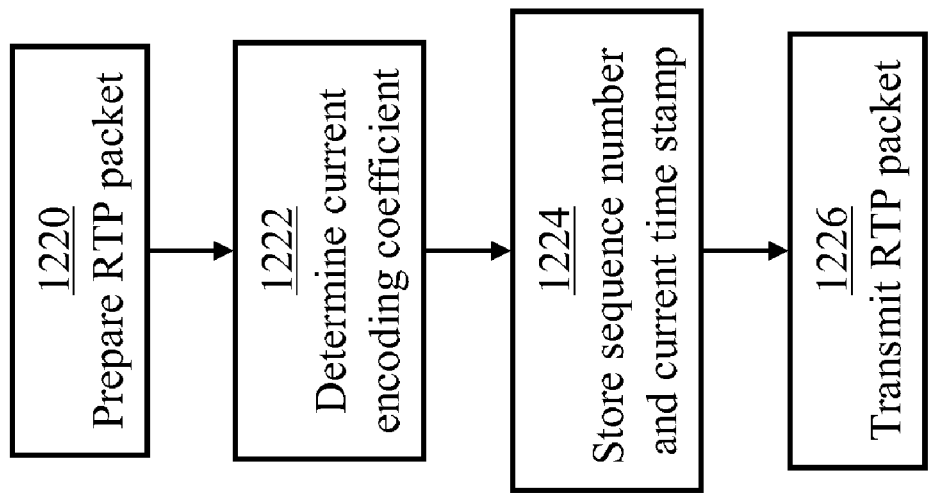
FIG. 12 illustrates the use of a standard protocol for communication between the streaming server and a client.

FIG. 12 illustrates data transfer from the streaming server 120 to a client 160 using the Real-time Transport Protocol.

The streaming server 120 prepares the RTP packet (step 1220) and in step 1222 a current value of the encoding coefficient is determined. In step 1224 a sequence number of the RTP packet and a time of transmitting the RTP packet are recorded. In step 1226 the RTP packet is transmitted to the client 160.

Figure 13:
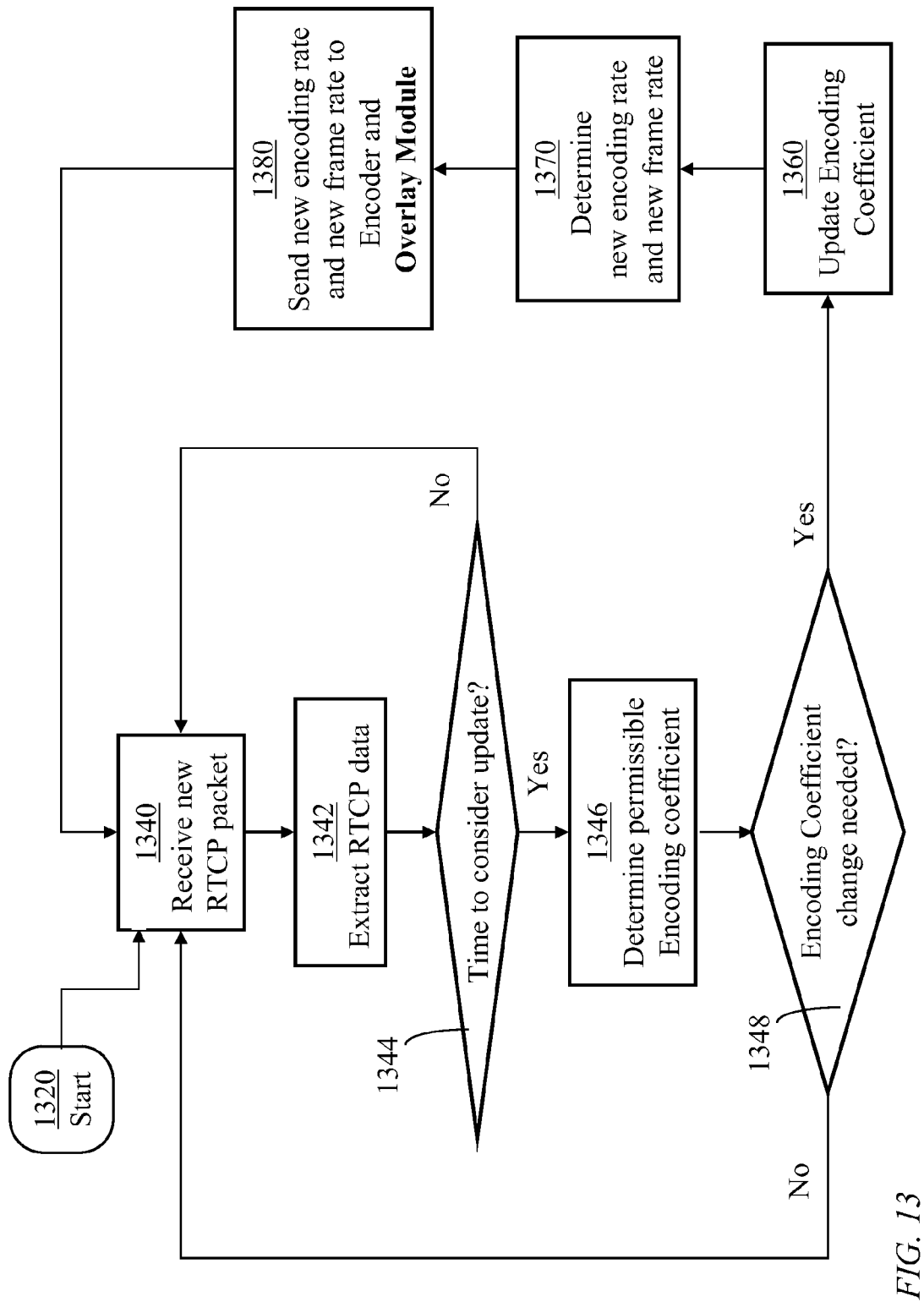
FIG. 13 illustrates a process of determining favorable encoding rate of a signal using a standard protocol and overlaying an indication of the favorable encoding rate on the signal, in accordance with an embodiment of the present invention.

FIG. 13 illustrates a process of receiving RTCP (Real-time Control Transport Protocol) packets from the client 160 and determining a permissible encoding rate accordingly. The process is activated in step 1320. The flow controller 260 (FIG. 2) receives RTCP packets (step 1340) through network interface 250 and extracts measurement data from the RTCP packet (step 1342). A difference between a current time instant and a time instant of a preceding update of the encoding coefficient is determined in step 1344. If the time difference is less than a predefined minimum update interval, step 1340 is revisited to consider a waiting or forthcoming RTCP packet. Otherwise, if the time difference equals or exceeds the minimum update interval, step 1346 determines a new permissible encoding rate. Step 1348 determines whether an update of the encoding coefficient is needed. If so, a new encoding coefficient is determined. Otherwise step 1340 is revisited. In steps 1360 and 1370, the encoding coefficient is updated and communicated to the encoder 240 and to the overlay module 230 (step 1380). The flow controller 260 (FIG. 2) is then ready to consider a new RTCP packet (step 1340).

Figure 14:
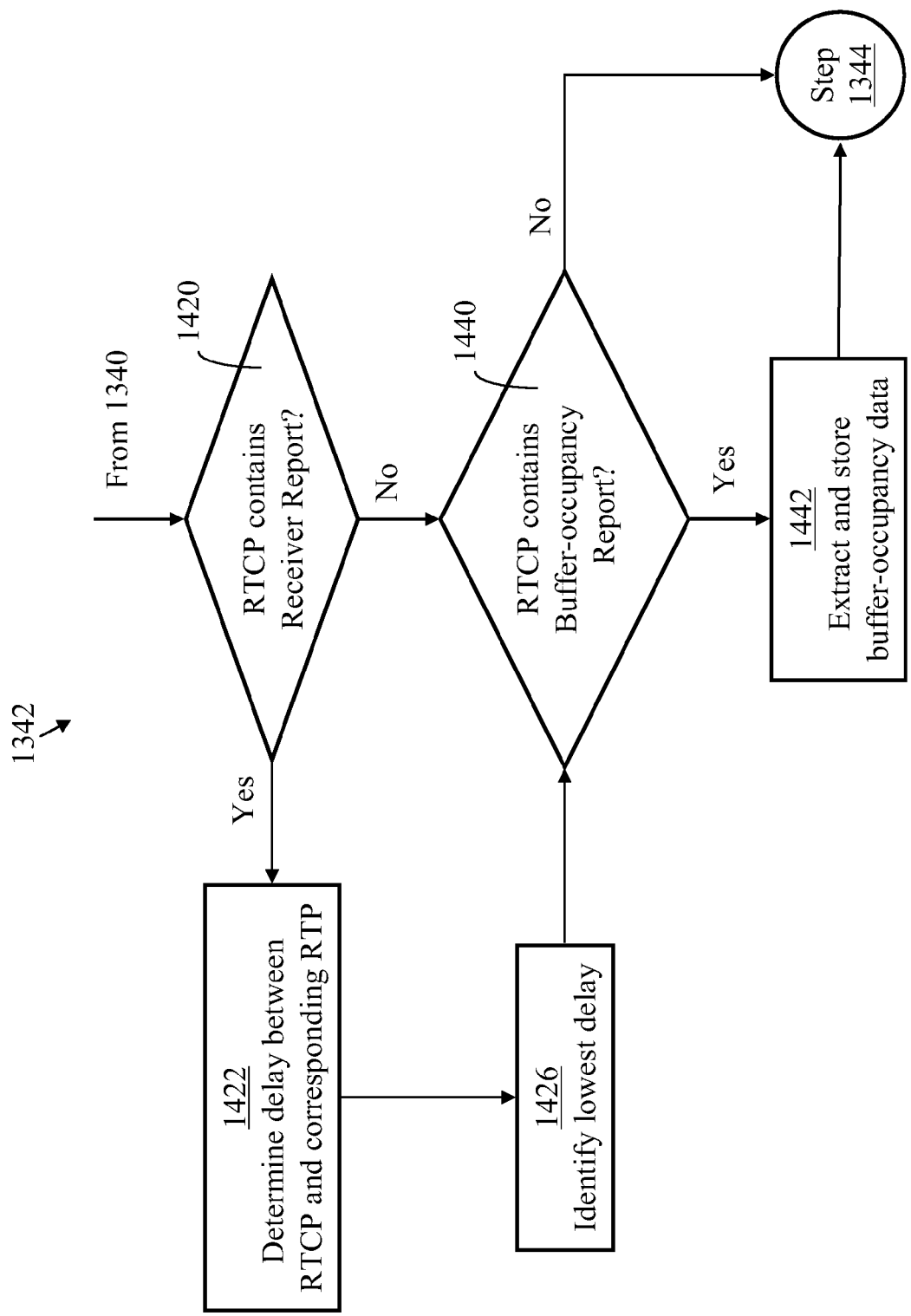
FIG. 14 details a step of extracting connection characterizing data from feedback signals received from a client, in accordance with an embodiment of the present invention.

FIG. 14 details step 1342 of FIG. 13. In step 1420, a received RTCP packet is examined to determine if it contains a "receiver report" from the client 160. If the RTCP packet does not contain a receiver report, step 1440 is implemented to determine if the RTCP packet contains a buffer-occupancy report. If the RTCP packet contains a receiver report, step 1422 determines a transfer-delay as a time difference between the current time of arrival of the RTCP packet and the time of transmitting a corresponding RTP packet. The corresponding RTP packet is the RTP packet having a sequential number which matches a number indicated in field "extended highest sequence number received" of the RTCP receiver report. In step 1426, a minimum transfer delay is determined as the lesser of the transfer delay calculated in step 1422 and a previous value of the minimum transfer delay for the connection. The minimum transfer delay is initialized as an arbitrary large value. The minimum transfer delay is retained for future use as a reference for gauging fluctuating transfer delay. If step 1440 determines that the receiver report does not contain a buffer-occupancy report, the process is directed to step 1344 of FIG. 13. Otherwise, buffer-occupancy data are extracted in step 1442 and the process is directed to step 1340 of FIG. 13

Figure 15:
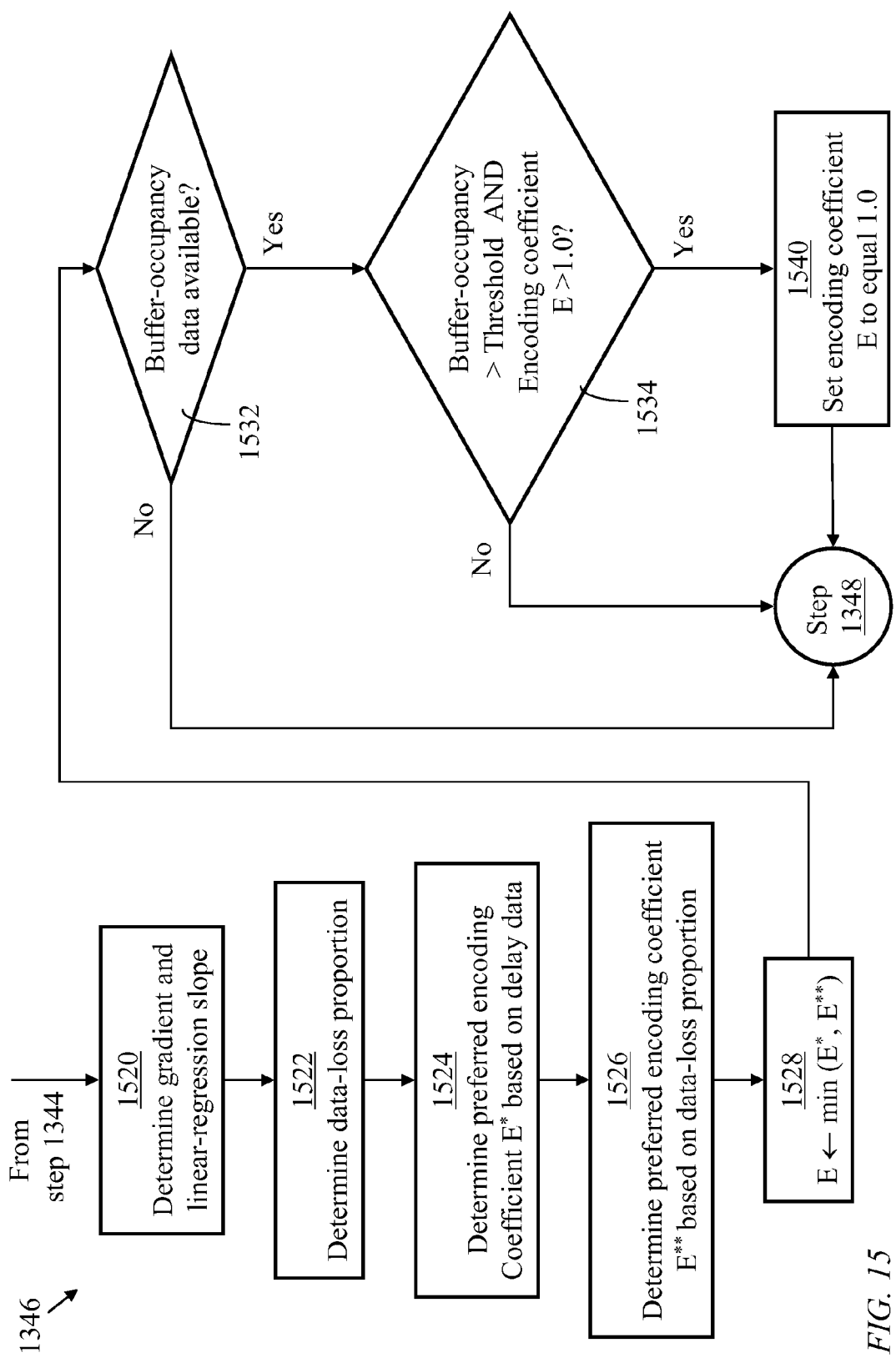
FIG. 15 details a step of determining a permissible encoding rate, in accordance with an embodiment of the present invention.

FIG. 15 provides an overview of steps of determining connection metrics and a corresponding encoding coefficient (step 1346 of FIG. 13). In step 1520, the slope of a regression line of performance measurements taken over a time window is computed using any of known analytical methods. The gradient of the measurements near the end of the time window is also determined. In step 1522 a statistic of data-loss over the time window is determined. In step 1524, a preferred value of the encoding coefficient, denoted E*, based on the regression-line slope and the gradient, is determined. In step 1526, a preferred value of the encoding coefficient, denoted E**, is determined according to the data-loss statistic determined in step 1522. In step 1528, a new encoding coefficient E is selected as the lesser of E* and E**. Under favorable connection conditions, the preferred encoding coefficient may be allowed to exceed 1.0, i.e. the encoder may produce a stream momentarily having a flow rate (bit-rate) exceeding the nominal flow rate assigned to the connection.

The encoding coefficient E just determined may be further modified according to occupancy of a buffer placed at the client-end of the connection. Step 1532 directs the process to step 1348 (FIG. 13) if buffer-occupancy data is not available. Otherwise, step 1534 determines if a statistic of buffer-occupancy measurements taken over the time window exceeds a predefined threshold. If so, and if the encoding coefficient determined step 1528 exceeds 1.0, the preferred encoding coefficient is reduced to 1.0 in step 1540 and the process is directed to step 1348 of FIG. 13. Otherwise, if the condition of step 1534 is not met, step 1534 directs the process to step 1348 of FIG. 13. It is noted that steps 1534 and 1540 follow a selected rule. Other rules governing the use of buffer-occupancy statistics may be used.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A method of informative data streaming, implemented by a streaming server computer, the method comprising:
encoding, using an encoder coupled to the streaming server computer, each signal of a multimedia signal having a plurality of signals of different signal types according to a signal-specific encoding rate, initially set to a respective predefined value, to produce multimedia data comprising a plurality of data components having a one-to-one correspondence to said plurality of signals;
transmitting said multimedia data from said streaming server computer to a client over a telecommunication channel;
receiving feedback information from said client;
determining quality metrics of said telecommunication channel according to said feedback information;
determining, for said each signal, a permissible bit rate according to said quality metrics;
adjusting said signal-specific encoding rate to a value not exceeding said permissible bit rate;
producing a notification signal indicating said quality metrics and said signal-specific encoding rate for said each signal; and
superimposing said notification signal on a selected signal among said plurality of signals;
determining an additional notification-display interval;
observing said each signal over distinctly defined successive time intervals;
examining said feedback information over distinctly defined successive time intervals;
extracting, from said feedback information:
a current data-loss fraction; and
a current transfer delay between said streaming server computer and said client;
determining a first relative difference between said current data-loss fraction and a previous data-loss fraction;
determining a second relative difference between said current transfer delay and a previous transfer delay;
wherein an absolute value of one of said first relative difference and said second relative difference exceeds a predetermined variation threshold:
superimposing on said selected signal, during said additional notification-display interval, indications of said current data-loss fraction, said first relative difference, said current transfer delay and said second relative difference;
equating said previous data-loss fraction to said current data-loss fraction; and
equating said previous transfer delay to said current transfer delay.

2. The method of claim 1 further comprising:
determining, for said each signal, an indication of an acceptable bit rate of a de-coder associated with said client; and
determining said respective initial value of said signal-specific encoding rate according to said acceptable encoding rate.

3. The method of claim 1 further comprising a step of selecting a time interval for said superimposing of said notification signal, said time interval following a relative change of said permissible bit rate exceeding a predetermined value.

4. The method of claim 1 further comprising activating the step of superimposing periodically, during a notification-display interval, following every reporting period of specified duration.

5. The method of claim 1 further comprising:
determining a mean value of said signal-specific encoding rate over successive observation intervals; and
responsive to a determination that said mean value is smaller than a predetermined threshold corresponding to said each signal, inserting an indication of said mean value in said selected signal.

6. The method of claim 1 wherein said multimedia data comprise real-time-transport-protocol (RTP) packets and said feedback information is acquired from real-time-transport-control-protocol (RTCP) packets received from said client.

7. An informative streaming server computer comprising:
a device for signal interface communicatively coupled to a plurality of signal sources providing a plurality of signals of different signal types;
a processor;
a computer readable non-transitory storage medium storing thereon instructions executable by the processor to form:
an overlay module for superimposing notification data on selected signals from among said plurality of signals;
an adaptive encoder for receiving said plurality of signals from said overlay module and producing a plurality of data streams, having a one-to-one correspondence to said plurality of signals, according to a specified encoding rate for each signal of said plurality of signals;
a probing module for generating probing packets;
a network interface for transmitting said data streams and said probing packets over a telecommunication channel to at least one client from among a plurality of clients and receiving response packets from said at least one client; and
a flow controller for:
analyzing said probing packets and said response packets to determine a permissible encoding rate for said each signal;
instructing said adaptive encoder to encode said each signal according to said permissible encoding rate;
presenting an indication of said new encoding rate to said overlay module for inclusion in said notification data;
said instructions further comprise instruction executable by the processor to:
determine an additional notification-display interval;
observe said each signal over distinctly defined successive time intervals;
examine said feedback information over distinctly defined successive time intervals;
extract, from said feedback information:
a current data-loss fraction; and
a current transfer delay between said streaming server computer and said client:
determine a first relative difference between said current data-loss fraction and a previous data-loss fraction;
determine a second relative difference between said current transfer delay and a previous transfer delay;
wherein an absolute value of one of said first relative difference and said second relative difference exceeds a predetermined variation threshold:
superimpose on said selected signal, during said additional notification-display interval, indications of said current data-loss fraction, said first relative difference, said current transfer delay and said second relative difference;
equate said previous data-loss fraction to said current data-loss fraction; and
equate said previous transfer delay to said current transfer delay.

8. The informative streaming server computer of claim 7 wherein said adaptive encoder comprises:
a plurality of encoding modules for producing said plurality of data streams, each encoding module for encoding signals of a respective signal type; and
a combining module for interleaving said data components.

9. The informative streaming server computer of claim 8 wherein at least one encoding module from among said plurality of encoding module comprises:
a tracking module for determining variations of a specific signal received from said overlay module over successive frame periods; and
a stream-formation module for producing encoded data representing said specific signal under constraint of a permissible bit rate received from said flow controller and communicating said encoded data to said client through said network interface.

10. The informative streaming server computer of claim 9 wherein said tracking module comprises computer-executable instructions for:
determining mean values of bit rates of said encoded data over successive observation intervals, each observation interval comprising a predetermined integer multiple of a frame period; and
responsive to an indication that a specific mean value of bit rate over an observation interval is less than a predetermined fraction of said permissible bit rate, communicating said specific mean value to said overlay module for inclusion in said notification data.

11. The informative streaming server computer of claim 7 wherein said device for signal interface comprises means for acquisition of signal types including at least one of an audio signal, a video signal, a still image, an animation, and a text.

12. The informative streaming server computer of claim 7 wherein said overlay module further comprises multiple overlay units, each for superimposing a notification compatible with a specific signal type.

13. The informative streaming server computer of claim 7 wherein said probing module comprises computer-executable instructions for:
formulating real-time-transport-protocol (RTP) packets; and
interpreting real-time-transport-control-protocol (RTCP) packets received from an external source.

14. The informative streaming server computer of claim 7 further comprising a selector, coupled to said device for signal interface, said selector for presenting said selected signals to said overlay module and presenting remaining signals, from among said plurality of signals, other than said selected signals directly to said adaptive encoder.

15. The informative streaming server of claim 7 wherein said adaptive encoder comprises several encoding modules for encoding signals of different signal types; said signal types including at least two of:
an audio signal;
a video signal;
a still image;
an animation; and
a text.

* * * * *